United States Patent
Kim et al.

(10) Patent No.: US 10,989,463 B2
(45) Date of Patent: Apr. 27, 2021

(54) REFRIGERATOR CONTROLLING FRESHNESS ON BASIS OF CONTEXT AWARENESS AND ARTIFICIAL INTELLIGENCE, SERVER, PORTABLE DEVICE, AND METHOD FOR CONTROLLING FRESHNESS

(71) Applicant: LG ELECTRONICS INC., Seoul (KR)

(72) Inventors: Sang Oh Kim, Seoul (KR); Hyung Yul Kim, Seoul (KR); Jongho Yun, Seoul (KR); Cholok Han, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 127 days.

(21) Appl. No.: 16/307,679

(22) PCT Filed: May 24, 2017

(86) PCT No.: PCT/KR2017/005431
§ 371 (c)(1),
(2) Date: Dec. 6, 2018

(87) PCT Pub. No.: WO2017/213367
PCT Pub. Date: Dec. 14, 2017

(65) Prior Publication Data
US 2019/0264976 A1    Aug. 29, 2019

(30) Foreign Application Priority Data
Jun. 9, 2016  (KR) .................. 10-2016-0071844

(51) Int. Cl.
*F25D 29/00* (2006.01)
*A23L 3/00* (2006.01)
*G06Q 10/10* (2012.01)

(52) U.S. Cl.
CPC ............ *F25D 29/005* (2013.01); *A23L 3/001* (2013.01); *F25D 29/00* (2013.01); *F25D 29/008* (2013.01);
(Continued)

(58) Field of Classification Search
CPC ................... F25D 29/005; F25D 29/00; F25D 2317/04111; F25D 2317/0415;
(Continued)

(56) References Cited

U.S. PATENT DOCUMENTS 8,960,563 B1 * 2/2015 Perten .................. F25D 29/003
                                                           236/51
2004/0159714 A1 * 8/2004 Gatling .................. F25D 29/00
                                                            236/51

(Continued)

FOREIGN PATENT DOCUMENTS

EP          3091318 A1 * 11/2016 ........... F25D 29/003
KR      10-0673706          1/2007
(Continued)

OTHER PUBLICATIONS

International Search Report dated Aug. 14, 2017 issued in Application No. PCT/KR2017/005431.

*Primary Examiner* — Nelson J Nieves
(74) *Attorney, Agent, or Firm* — KED & Associates LLP

(57) ABSTRACT

The present invention relates to a refrigerator controlling freshness on the basis of context awareness and artificial intelligence, a server, a portable device, and a method for controlling freshness. The refrigerator controlling freshness on the basis of context awareness, according to one embodiment of the present invention, comprises: one or more partitioned storage spaces; one or more freshness sensors for sensing the freshness in an outside area or the storage spaces; a communication unit for receiving operation
(Continued)

instruction information from the server or the portable device, and transmitting, to the server or the portable device, freshness condition information generated by the freshness sensors; and a control unit for controlling the freshness sensors and the communication unit, and performing a freshness control operation according to operation instruction information instructing an operation that differs from pre-set operating condition information that is set for any one or more of the storage spaces.

13 Claims, 17 Drawing Sheets

(52) U.S. Cl.
CPC ..... *G06Q 10/10* (2013.01); *F25D 2317/0415* (2013.01); *F25D 2317/04111* (2013.01); *F25D 2400/36* (2013.01)

(58) Field of Classification Search
CPC ....... F25D 2317/041; F25D 2317/0411; F25D 2500/06
See application file for complete search history.

(56) References Cited

U.S. PATENT DOCUMENTS

| | | | |
|---|---|---|---|
| 2008/0307818 A1 | 12/2008 | Min et al. | |
| 2012/0181911 A1* | 7/2012 | Kim | A61L 2/14 312/405 |
| 2014/0229137 A1* | 8/2014 | Rusnack | G05D 23/1917 702/130 |
| 2015/0345847 A1* | 12/2015 | Rusignuolo | F25D 29/003 62/56 |
| 2016/0058040 A1* | 3/2016 | Met | F25D 27/005 312/404 |
| 2016/0280040 A1* | 9/2016 | Connell | G07C 5/008 |
| 2017/0267426 A1* | 9/2017 | Wang | F25D 17/042 |

FOREIGN PATENT DOCUMENTS

| | | | | |
|---|---|---|---|---|
| KR | 10-0830476 | | 5/2008 | |
| KR | 10-1156733 | | 6/2012 | |
| KR | 10-2012-0072102 | | 7/2012 | |
| KR | 10-1260649 | | 5/2013 | |
| WO | WO-2012095265 A2 | * | 7/2012 | ............. F25D 21/14 |
| WO | WO-2012160795 A1 | * | 11/2012 | ........... F25D 17/042 |
| WO | WO-2016131609 A1 | * | 8/2016 | ........... F25D 29/005 |
| WO | WO-2017213367 A1 | * | 12/2017 | ............. A23L 3/001 |

\* cited by examiner

FIG. 1
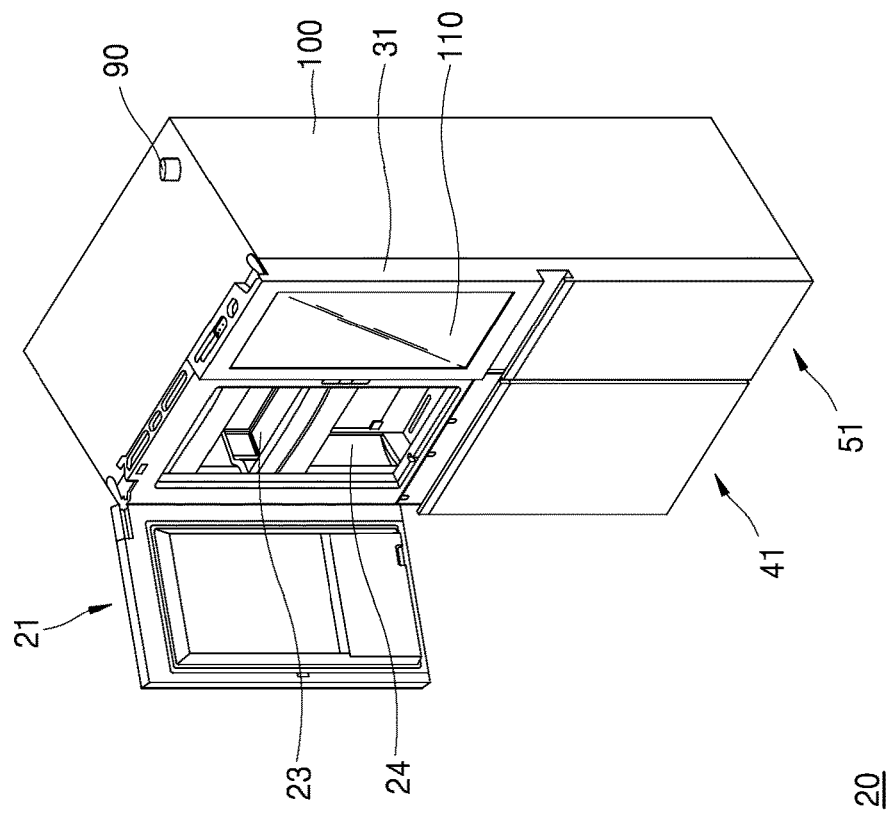
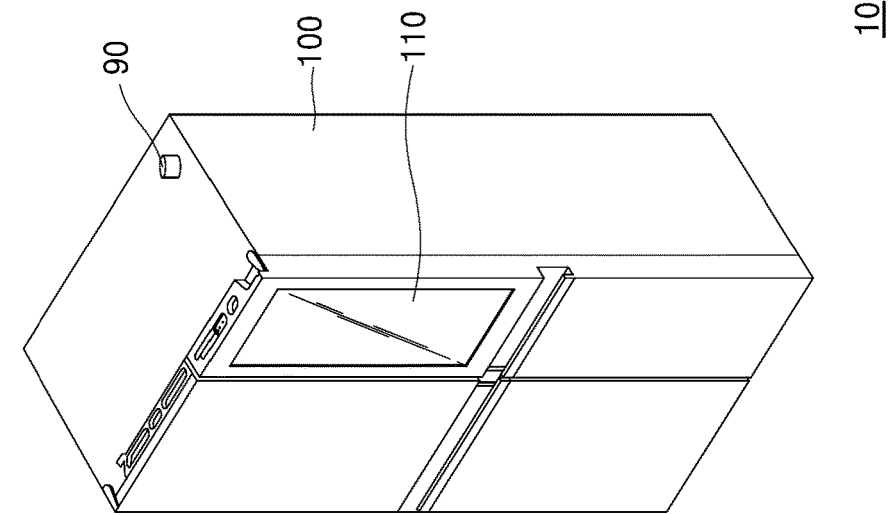

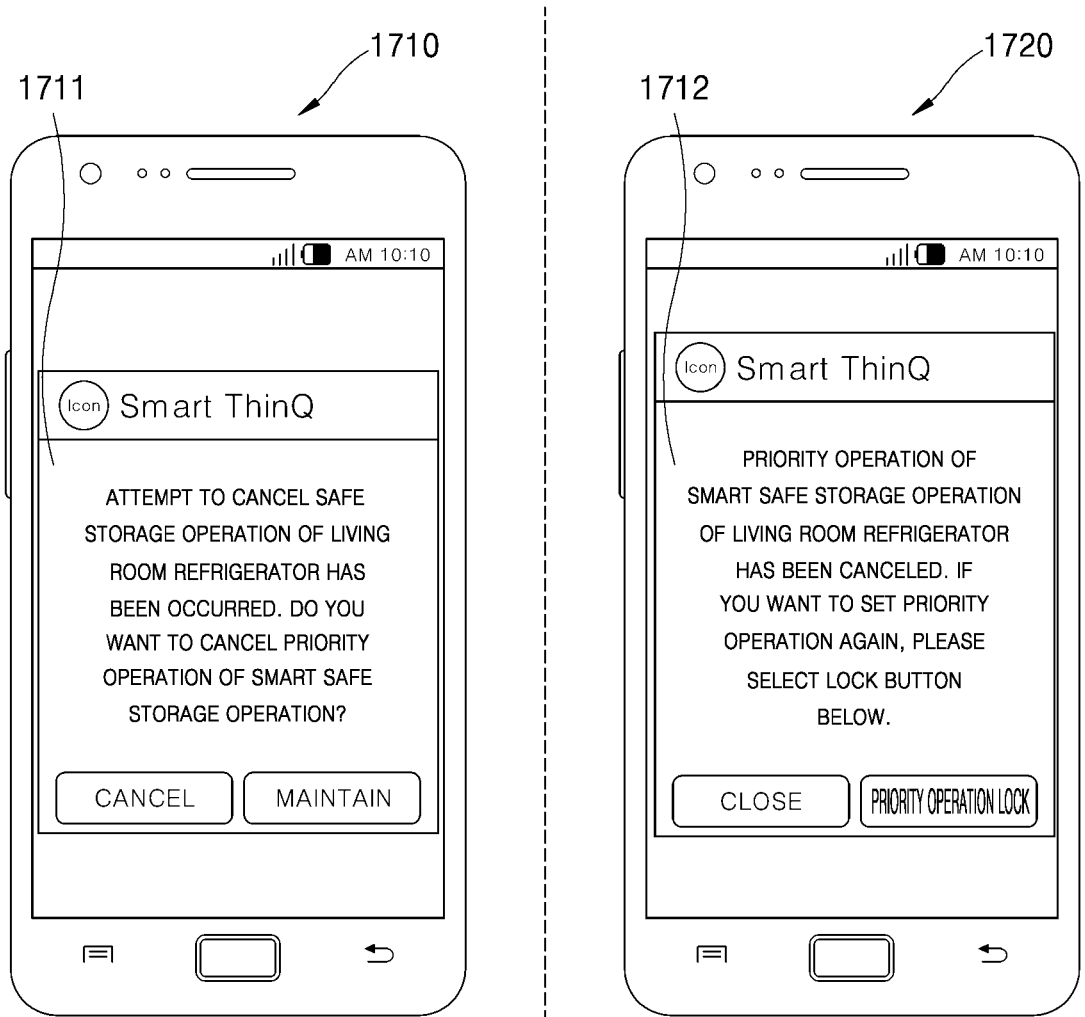

REFRIGERATOR CONTROLLING FRESHNESS ON BASIS OF CONTEXT AWARENESS AND ARTIFICIAL INTELLIGENCE, SERVER, PORTABLE DEVICE, AND METHOD FOR CONTROLLING FRESHNESS

CROSS-REFERENCE TO RELATED PATENT APPLICATIONS

This application is a U.S. National Stage Application under 35 U.S.C. § 371 of PCT Application No. PCT/KR2017/005431, filed May 24, 2017, which claims priority to Korean Patent Application No. 10-2016-0071844, filed Jun. 9, 2016, whose entire disclosures are hereby incorporated by reference.

TECHNICAL FIELD

The present invention relates to a refrigerator controlling freshness on the basis of context awareness, a server, a portable device, and a method for controlling freshness.

BACKGROUND ART

A refrigerator, which is an apparatus for maintaining or cooling temperatures of various types of stored goods at a low temperature, includes a storage box composed of one or more separate spaces. The refrigerator has a temperature change interval/range which can be maintained at a maximum in a process of generating a product and shipping the product, and a user can set temperature of the refrigerator by adjusting the temperature of the refrigerator within the interval/range.

The user does not easily change the temperature of the refrigerator after setting the temperature of the refrigerator. When an external environmental factor changes in a state in which the temperature of the refrigerator is fixed, there is a limitation in controlling freshness in the refrigerator. In particular, when a region around the refrigerator or a region where the refrigerator is located becomes hot and humid according to an external environment, freshness of food brought into the refrigerator may be decreased. In particular, due to the external environment, many foods may be brought in with low freshness, and such foods may affect other foods in the refrigerator.

However, since the refrigerator operates according to criteria set by the user, there has been a problem that external conditions are not adequately reflected in a cooling or freezing function of the refrigerator.

DISCLOSURE

Technical Problem

In order to solve the above-described problems, it is an object of this application to provide a method in which a refrigerator controls a freshness control operation of the refrigerator in a context-aware manner at a time point when it is required to control freshness due to an increase in temperature and humidity around the refrigerator, and a refrigerator using the same.

It is another object of this application to provide a refrigerator controlling freshness by receiving result of monitoring of factors and result of history of factors, that the factors are related to freshness such as temperature, humidity and the like in a region where the refrigerator is located from a server, and reflecting the result.

It is still another object of this application to control an operation of the refrigerator for controlling freshness from outside by controlling a portable device corresponding to the refrigerator, thereby preserving a quality of food.

The objects of the present invention are not limited to the above-mentioned objects, and the other objects and the advantages of the present invention which are not mentioned can be understood by the following description, and more clearly understood by the embodiments of the present invention. It will be also readily seen that the objects and the advantages of the present invention may be realized by means indicated in the patent claims and a combination thereof.

Technical Solution

According to one embodiment of the present invention, there is provided a refrigerator controlling freshness on the basis of context awareness (or ambient condition awareness). The refrigerator may include one or more partitioned storage spaces, one or more freshness sensors for sensing freshness (or sensing ambient conditions) of an outside (e.g., external to the refrigerator) or the storage spaces, a communication unit for receiving operation instruction information from a server or a portable device, and transmitting freshness condition information (or ambient condition information) generated by the freshness sensors to the server or the portable device, and a control unit for controlling the freshness sensors and the communication unit, and performing a freshness control operation according to operation instruction information for instructing an operation different from setup operating condition information that is set for any one or more of the storage spaces.

According to another embodiment of the present invention, there is provided a refrigerator controlling freshness on the basis of context awareness. The refrigerator may include one or more partitioned storage spaces, one or more freshness sensors for sensing freshness of an outside or the storage spaces, a communication unit for transmitting and receiving information to and from a server or a portable device, a freshness context awareness unit for generating context awareness operating condition information that is operating condition information different from setup operating condition information that is set for any one or more of the storage spaces on the basis of freshness condition information sensed by the freshness sensors, and a control unit for controlling the freshness sensors, the freshness context awareness unit and the communication unit, and performing a freshness control operation on the basis of the context awareness operating condition information.

According to still another embodiment of the present invention, there is provided a server controlling freshness on the basis of context awareness. The server may include a communication unit for communicating with a refrigerator and a portable device, a database unit for storing freshness condition information of the refrigerator received from the refrigerator, a logic unit for generating operation instruction information necessary for the refrigerator to operate by using the received freshness condition information and information stored in the database unit, and a control unit for controlling the communication unit, the database unit and the logic unit, and controlling the communication unit to transmit the operation instruction information to the refrigerator.

According to still another embodiment of the present invention, there is provided a portable device controlling freshness on the basis of context awareness. The portable device may include an application storage unit for receiving and displaying freshness condition information of a refrigerator, and storing an application for controlling an operation of the refrigerator, a communication unit for transmitting a setup condition that is set by the application to a server and receiving a message including freshness condition information that is received from the refrigerator and performance result information of the refrigerator from the server, an interface unit for outputting a screen of the application, and a control unit for executing the application and controlling the communication unit and the interface unit, and the above-described message may include any one or more of freshness condition information, history information including an performance result, and setup information of the refrigerator to be changed.

According to still another embodiment of the present invention, there is provided a method for controlling freshness on the basis of context awareness. The method may include a step of receiving, by a communication unit of a server, freshness condition information from a refrigerator, a step of generating, by a control unit of the server, operation instruction information of the refrigerator on the basis of the received freshness condition information, previously stored freshness condition information, and information on temperature and humidity in a region where the refrigerator is located that is stored for a predetermined period of time, and a step of transmitting, by the communication unit, the operation instruction information to the refrigerator.

Advantageous Effects

When the present invention is applied, even when temperature and humidity around a refrigerator increase, the refrigerator may control a freshness control operation of the refrigerator in a context-aware manner.

Further, when the present invention is applied, the refrigerator may perform an operation for maintaining freshness in advance by reflecting result of monitoring of factors and history of factors, that the factors are related to freshness such as temperature, humidity and the like in a region where the refrigerator is located.

Furthermore, when the present invention is applied, it is possible to control the freshness of the refrigerator from outside by controlling a portable device.

Effects of the present invention are not limited the aforementioned effects. Those skilled in the art can easily derive various effects of the present invention from a configuration of the present invention.

DESCRIPTION OF DRAWINGS

FIG. 1 is a view showing a freshness-context-aware refrigerator according to one embodiment of the present invention.

FIG. 17 is a view showing a screen of a portable device according to one embodiment of the present invention.

BEST MODE

Figure 2:
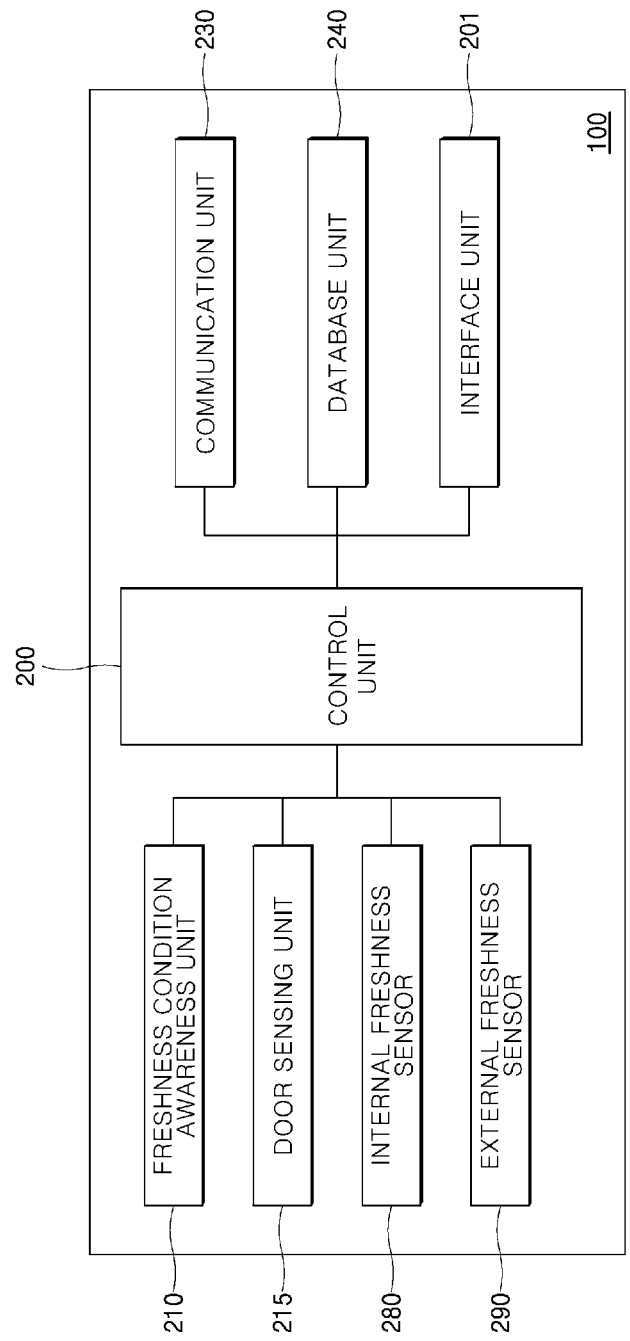
FIG. 2 is a view showing a configuration of a refrigerator that controls freshness in a context-aware manner according to one embodiment of the present invention.

Hereinafter, embodiments of the present invention will be described in detailed with reference to the accompanying drawings so that those skilled in the art can easily carry out the present invention. The present invention is not limited to the embodiments disclosed herein but may be implemented in various different forms.

In order to clearly describe the embodiments, the description irrelevant to the embodiments has been omitted. Same or like reference numerals designate same or like components throughout the specification. Further, some embodiments will be described in detail with reference to the illustrative drawings. Regarding the reference numerals assigned to the components in the drawings, it should be noted that the same components will be designated by the same reference numerals, wherever possible, even though they are shown in different drawings. Furthermore, in relation to describing the present invention, the detailed description of well-known related configurations or functions can be omitted when it is deemed that such description may cause ambiguous interpretation of the present invention.

Also, in relation to describing components of the present invention, terms such as first, second, A, B, (a), (b) or the like may be used. Each of these terms is not used to define an essence, order, sequence or the number of a relevant component but used merely to distinguish the relevant component from other component(s). It should be noted that, when it is described in the specification that one component is "connected," "coupled" or "joined" to another component, the former may be directly "connected," "coupled," and "joined" to the latter or "connected", "coupled", and "joined" to the latter via another component.

In addition, in relation to implementing the present invention, features of the present invention may be described as being performed by separate components for ease of explanation. However, these features may be implemented by a single device or module or one feature may be implemented by several devices or modules.

In this application, a refrigerator is mainly described as an apparatus for cooling or freezing stored goods. The refrigerator may include various apparatuses configured to mainly perform a cooling and freezing function such as a general refrigerator that stores a food, a kimchi refrigerator, a beverage refrigerator, a household refrigerator, a commercial refrigerator, a freezing apparatus composed of only a freezer, and the like. Also, the refrigerator may be an apparatus configured to cool non-food stored goods such as a cosmetic refrigerator. In addition, a refrigeration apparatus installed in a movable type rather than a stationary type, for example, a large-size refrigerated trailer, may be also included in embodiments referred to herein.

FIG. 1 is a view showing a refrigerator that controls freshness on the basis of context awareness according to one embodiment of the present invention. 10 indicates an appearance of a refrigerator 100 in a closed state, and 20 indicates an appearance of the refrigerator 100 in an open state. A space that is opened and closed by one door 21 of a plurality of doors 21, 31, 41 and 51 constituting the refrigerator 100 may be divided into a plurality of storage spaces 23 and 24, and temperatures of the respective storage spaces 23 and 24 may be controlled independently. Of course, with respect to spaces opened and closed by one door, temperatures thereof may be controlled in the same manner.

The refrigerator 100 may further include a display unit 110 for displaying information or an interior of the refrigerator 100. The display unit 110 may be disposed on a front surface of a particular door 31 or a side surface of the refrigerator 100.

Further, in order to control freshness on the basis of context awareness, the refrigerator 100 may include a freshness sensor (not shown in the drawings) in the storage spaces 23 and 24. Also, one or more external freshness sensors 90 may be disposed on an outer surface of the refrigerator 100 to check freshness outside the refrigerator 100. The external freshness sensors 90 may sense temperature and humidity in a space where the refrigerator is located. Thus, when temperature or humidity around the refrigerator 100 increases, a control unit of the refrigerator 100 may determine that the current environment is an environment in which freshness is decreased, and may control cooling or freezing temperature of the refrigerator 100 or perform a function for dehumidification or sterilization.

In addition to the external freshness sensors 90, an internal freshness sensor for sensing freshness may be disposed in each storage space. Also, instead of disposing the internal freshness sensors in each of the storage spaces 23 and 24, one internal freshness sensor (not shown in the drawings) may be disposed in a space that is opened and closed by a door. For example, since the two storage spaces 23 and 24 are opened and closed by one door 21, one internal freshness sensor may be disposed in the two storage spaces 23 and 24.

The refrigerator 100 may operate in a freshness control mode to maintain freshness thereof by reflecting conditions such as temperature and humidity sensed by the internal freshness sensor or the external freshness sensors 90 and local characteristics of a region where the refrigerator 100 is located. For example, when the freshness of the refrigerator 100 becomes lower due to seasonal changes or weather changes even though an operating temperature set by the user for the refrigerator 100 is 3 degrees Celsius, the refrigerator 100 may operate on the basis of 1.5 degrees Celsius lower than the above-mentioned 3 degrees Celsius. An external or internal freshness context-aware operation may be performed for a predetermined period of time, and a context-aware operating situation for freshness control may be displayed through the display unit 110 of the refrigerator 100. In addition, it is possible to display the context-aware operating situation of the refrigerator 100 through a server or a portable device, and the refrigerator 100 may provide an operation history to the server or the portable device.

FIG. 2 is a view showing a configuration of a refrigerator for controlling freshness in a context-aware manner according to one embodiment of the present invention.

FIG. 2 is a view showing components for controlling an operation of the above-described refrigerator 100 so that the refrigerator 100 controls freshness in a context-aware manner. The components provided in the refrigerator 100 to control the operation of the refrigerator 100 will be described in detail.

The above-described freshness sensor may be divided into two types. As described with reference to FIG. 1, an internal freshness sensor 280 may be disposed in each of the storage spaces or in the storage spaces opened and closed by a door, or may be disposed at a particular location in the refrigerator. An external freshness sensor 290 may be disposed outside the refrigerator 100. These freshness sensors may sense freshness of an outside or the storage spaces. In one embodiment, sensing freshness may mean sensing temperature and humidity. According to another embodiment, air around the freshness sensors 280 and 290 may be analyzed to calculate a distribution chart of bacteria that lowers freshness of food.

There is setup operating condition information that is preset by the user for each of the above-described storage spaces or for the plurality of storage spaces opened and closed by one door, or for the entire refrigerator. As described above, the user may input and set the setup operating condition so that a temperature of 3 degrees Celsius is maintained with respect to a cooling storage space of the refrigerator and a temperature of −20 degrees Celsius is maintained with respect to a freezing storage space of the refrigerator.

When the refrigerator 100 operates according to the setup operating condition, the refrigerator 100 may not operate efficiently in response to a change in an external or internal condition of the refrigerator 100. Therefore, the freshness context awareness unit (or freshness condition awareness/assessment module) may compare the setup operating condition information that is set for any one or more of the storage spaces and freshness condition information (or sensed conditions, ambient conditions) sensed by the freshness sensors 280 and 290 to generate context awareness operating condition information (or condition based operating condition information) different from the setup operating condition information. The above-described context awareness operating condition information may include time information for performing a freshness control operation, and deodorization operation information or sterilization operation information to be performed on any one of the storage spaces or the entire refrigerator.

In another embodiment, the freshness context awareness unit 210 may generate the context awareness operating condition information different from the setup operating condition information by using the operation instruction information received by the communication unit 230 (e.g., communication interface) from an external device. The operation instruction information may also consist of information similar to or same as the context awareness operating condition information. The operation instruction information may include any one or more of time information for performing a freshness control operation, deodorization operation information or sterilization operation information to be performed on any one of the storage spaces or the entire refrigerator, and temperature information.

According to one embodiment of the present invention, it is possible to control the refrigerator to operate in a context-aware manner by reflecting not only freshness around the refrigerator but also a characteristic of freshness of a region where the refrigerator is located. Also, the operation instruction information may be generated according to a logic or algorithm of a server disposed on the outside. It means that the operation instruction information may be generated by reflecting a change in the freshness accumulated in a relevant region although it is different from freshness condition information sensed around the refrigerator. The operation instruction information may be distinguished from the freshness condition information in terms of a configuration of information. For example, the freshness condition information may include humidity, temperature, a distribution of bacteria, etc., relative to freshness. On the other hand, the operation instruction information may include information on an operation mode of the refrigerator 100 for maintaining freshness in addition to the above-described humidity, temperature and distribution chart of bacteria. In this case, the freshness context awareness unit 210 may generate the context awareness operating condition information by using the information on the mode. The operation instruction information may include information on the operation mode provided by the external device by using the freshness condition information.

The operating condition information may be temperature and humidity that the refrigerator 100 needs to maintain during cooling or freezing in relation to the operation of the refrigerator 100. Further, the operating condition information may include information for instructing whether to perform a function of sterilization, dehumidification, or deodorization in the refrigerator 100, and information for instructing a function of performing a strong cooling or freezing operation such as a power mode. A variety of information may be included according to a configuration of the refrigerator 100. In addition, it is also possible to set the refrigerator 100 to change temperature, humidity and the like that the refrigerator 100 needs to maintain according to time. Therefore, the operating condition information may include various information such as a particular condition to be maintained by the refrigerator 100, a type of function required for the refrigerator 100 to operate, time required to perform an operation, time to maintain a stoppage of operation, and the like.

The communication unit 230 may transmit/receive information to/from the external device. The external device may mean a device that transmits information required to control freshness in a context-aware manner to the refrigerator 100, receives an operating situation of the refrigerator 100, or transmits information for partially controlling the operation of the refrigerator 100, and may include all devices including a computing function. In one embodiment, the above-described external device may be a server that provides information to a plurality of refrigerators. In one embodiment, the external device may be also a portable device corresponding to one refrigerator.

That is, the external device may be a server (not shown in the drawings) that provides information or logic, programs, and the like required for the freshness context awareness unit 210 of the refrigerator 100 to operate. Another embodiment of the external device may include a server that is disposed outside to provide information, logic, and programs required for the freshness context awareness unit 210 to a plurality of refrigerators, or to share a database. Also, the portable device may include a smart phone, a tablet PC, and the like. The portable device may be a device (not shown in the drawings) that provides information or logic, programs, or the above-described database required for the freshness context awareness unit 210 of the refrigerator 100 to operate, or monitors the operating situation of the refrigerator 100.

The communication unit 230 may receive the operation instruction information from the external device, and the freshness context awareness unit 210 may generate the context awareness operating condition information by comparing the operation instruction information and the setup operating condition information. Alternatively, the control unit 200 may perform a freshness control operation without the freshness context awareness unit 210 on the basis of the operation instruction information received by the communication unit 230. That is, the freshness context awareness unit 210 may be selectively included in the refrigerator 100.

Also, the communication unit 230 may transmit freshness condition information to the external device such as the server or the portable device. This is to provide ambient condition information of the current refrigerator to the server or the portable device and selectively receive the operation instruction information for responding thereto from the server or the portable device. The communication unit 230 may communicate with the external device by using a wireless LAN (Wi-Fi) or a mobile communication.

The database unit 240 may store information, logic, databases, programs, and the like from the above-described external device, or may store an operation result of the refrigerator 100 and provide the operation result to the external device through the communication unit 230.

The refrigerator 100 may further include an interface unit 201 for displaying the operating situation of the refrigerator 100 and allowing the user to input particular temperature or humidity, and an operation mode. The interface unit 201 may control characters, images, and the like to be displayed on the display unit 110 of FIG. 1, and may be integrated with the display unit 110 so that information is input through a touch screen of the display unit 110.

The control unit 200 may control the above-described freshness sensors 280 and 290, the freshness context awareness unit 210, the communication unit 230, the database unit 240, and the interface unit 201, and may perform a freshness control operation on the basis of the context awareness operating condition information. In one embodiment, the external freshness sensor 290 may include an outdoor air humidity sensor and an outdoor air temperature sensor for sensing humidity and temperature outside the refrigerator. Information sensed by these sensors may be input as a variable to be included in Equations 1 and 2 to be described later to instruct a particular operation to the refrigerator. For example, the refrigerator 100 may directly determine whether to perform a sterilization, dehumidification, or deodorization operation by using information sensed by the external freshness sensor 290, and the refrigerator 100 may provide the information sensed by the above-described external freshness sensor 290 to the external device, and as a result, the external device may instruct the refrigerator to perform the sterilization and deodorization operations.

The external device may provide information and logic required to be aware of a freshness condition to the refrigerator 100 in real time or according to a predetermined cycle so that the refrigerator 100 is directly aware of the freshness condition by using the sensed information.

In one embodiment, a food poisoning index may be calculated by using the information sensed by the outdoor air humidity sensor and the outdoor air temperature sensor of the refrigerator 100. In this case, parameters required for calculating the index may use a fixed value or a changed value. The changed value is a method of checking date by year and applying a parameter suitable for corresponding time for the refrigerator 100. Also, the refrigerator 100 may receive the above-described parameters or logic from the external devices. The external device may update or adjust the parameters required for calculating a food poisoning index or corruption index every time in consideration of characteristics of a region where the refrigerator 100 is located.

Hereinafter, a type of information used in this application will be described. The information of this application may be a predetermined record, a unit stored in a database, or the like. Also, the information of this application may also indicate data included in a packet in the process of transmitting and receiving data between devices.

An operating condition set by the refrigerator itself or set by the user is referred to as setup operating condition information. In one embodiment, the setup operating condition information may be configured as shown in Table 1.

TABLE 1

Setup operating condition information

| Identifier | Value |
|---|---|
| Ref_ID | R01 |
| TargetTemp1 | Temp01 |
| TargetTemp2 | Temp02 |
| fungistatic | ON |
| fungistatic_interval | 12 hr |
| dehumidify | OFF |
| PowerMode | OFF |

"fungistatic" may instruct whether or not to set a sterilizing function, and "dehumidify" may instruct whether or not to set a dehumidifying function. TargetTemp1 and TargetTemp2 each may mean target temperature for a particular storage space.

An operating condition generated by the refrigerator that is aware of an ambient condition is referred to as context awareness operating condition information. The context awareness operating condition information may be configured similar to the setup operating condition information.

TABLE 2

Context awareness operating condition information

| Identifier | Value |
|---|---|
| Ref_ID | R01 |
| TargetTemp1 | 2 |
| TargetTemp2 | −20 |
| fungistatic | ON |
| fungistatic_interval | 6 hr |
| dehumidify | ON |
| dehumidify_interval | 3 hr |
| PowerMode | ON |
| PowerMode_interval | 5 hr |

The operation instruction information, which is information received by the refrigerator from the outside, and the operation instruction information may include information of instructing operation of the refrigerator constructed by portable device or server. Similarly, the operation instruction information may be configured as shown in Table 3. The operation instruction information may selectively include instruction information on target temperature for a storage space. For example, the instruction information may not be included as shown in Table 3.

TABLE 3

Operation instruction information

| Identifier | Value |
|---|---|
| Ref_ID | R01 |
| Fungistatic | ON |
| Fungistatic_interval | 6 hr |
| dehumidify | ON |
| dehumidify_interval | 3 hr |
| PowerMode | ON |
| PowerMode_interval | 3 hr |

The freshness condition information may mean information on ambient conditions such as temperature, humidity and the like generated by the sensor of the refrigerator.

The freshness condition information may be configured based on temperature and humidity as "Ref_ID=R01 & Temp=T1 & Humidity=H1", but the present invention is not limited thereto.

As shown in FIG. 2, the refrigerator 100 may transmit ambient freshness condition information to the external device through the communication unit 230, and may receive freshness condition information of a relevant region generated by other refrigerators or operation instruction information based on the above-described freshness condition information from the external device.

As described above, the freshness context awareness unit 210 may be selectively included in the refrigerator 100. Further, the freshness context awareness unit 210 may determine a possibility of food degradation by using temperature or humidity sensed by the plurality of freshness sensors 280 and 290, or using average temperature and humidity in a region where the refrigerator is located, and may generate context awareness operating condition information by using a result of determination. In this process, the operation instruction information provided by the server or the portable device may be adjusted in line with the setup operating condition information of the refrigerator 100.

When the freshness context awareness unit 210 is included, the refrigerator 100 may determine temperature and humidity around the refrigerator in a context-aware manner to generate setup operating condition information. Also, the freshness context awareness unit 210 may generate the setup operating condition information to which the operation instruction information provided from the outside is applied without directly performing the operation instruction information. In addition, one embodiment of the context awareness operating condition information may include a target temperature lower than a set temperature included in the setup operating condition information set for the refrigerator 100 to allow the refrigerator to operate at a temperature lower than a temperature set by the user when there is a possibility of decrease in freshness.

The communication unit 230 may communicate with various external devices such as the server, portable device and the like. The present invention is based on a process of the communication unit 230 communicating with the portable device through the server, but the present invention is not limited thereto. That is, in the present invention, all types of computing devices having computing power may be disposed as server 300 for implementing the present invention. Portable devices such as a smart phone, a tablet and the like may be also applied.

In FIG. 2, the refrigerator 100 may selectively include a door sensing unit 215. At this time, the door sensing unit 215 may provide a trigger signal to the freshness sensors 280 and 290 to be aware of a freshness condition only when a door is opened or closed. Of course, the external freshness sensor 290 may sense freshness conditions such as temperature and humidity around the refrigerator 100 according to a predetermined schedule independently of opening or closing of the door.

Figure 3:
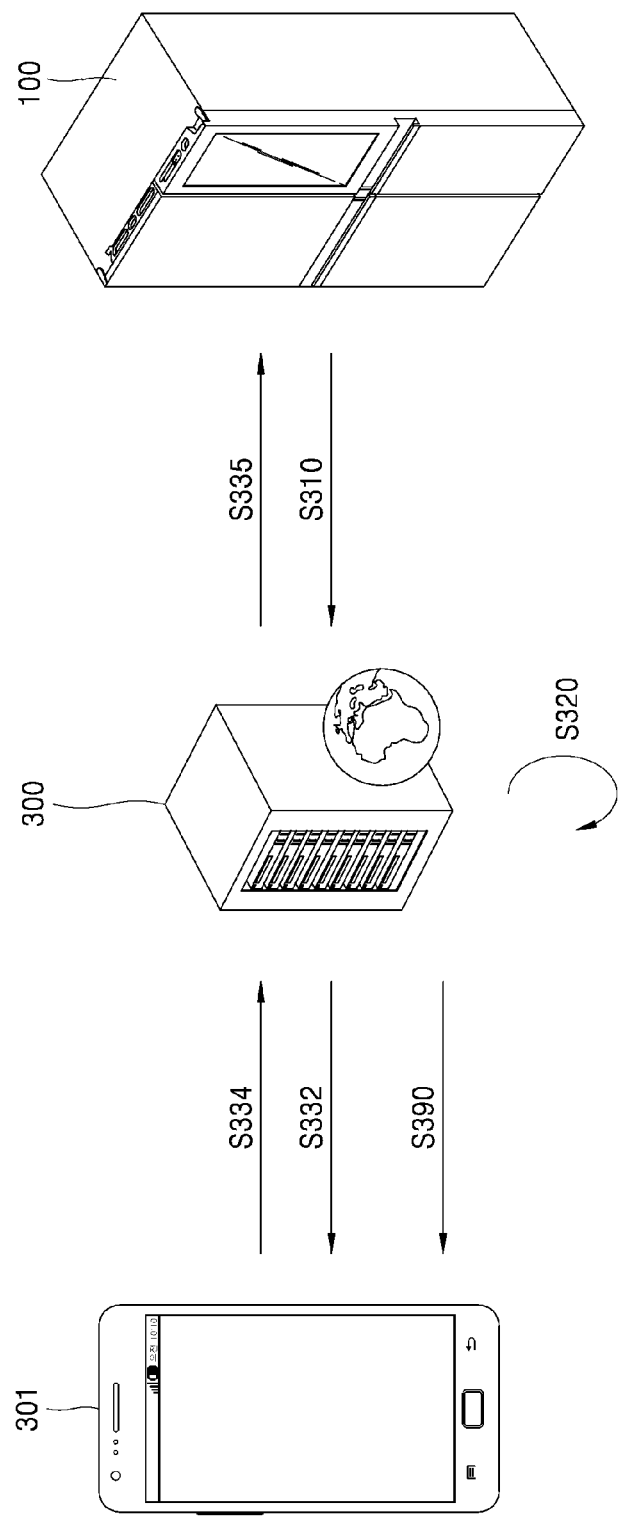
FIG. 3 is a view showing an interaction process between a refrigerator, a server and a portable device according to one embodiment of the present invention.

FIG. 3 is a view showing an interaction process between a refrigerator, a server and a portable device according to one embodiment of the present invention. The server and the portable device may be applied to the above-described external device.

The server 300 may be connected to a plurality of refrigerators to provide information to the refrigerators, and may also receive operating states of the refrigerators and freshness condition information on the periphery of the refrigerators. The received information may be transmitted to a portable device 301. The portable device 301 may be a smart phone, a tablet, a computer, a notebook, and the like of users of a particular refrigerator. An operation process thereof is as follows.

Referring to FIGS. 2 and 3, the communication unit 230 of the refrigerator 100 may transmit the freshness condition information sensed by the freshness sensors 280 and 290 to the server 300 according to a predetermined cycle or in real time at step S310. The freshness condition information may be configured as "Ref_ID=R01&Temp=T1&Humidity=H1". Identification information of the refrigerator 100 may be R01, temperature sensed by the freshness sensors 280 and 290 may be T1, and humidity sensed by the freshness sensors 280 and 290 may be H1. The communication unit 230 of the refrigerator 100 may transmit only information sensed by the external freshness sensor 290 among the internal freshness sensor 280 and the external freshness sensor 290.

Also, the communication unit 230 of the refrigerator 100 may transmit the freshness condition information to the server 300 at a time point when the freshness condition information changes according to time. Alternatively, the communication unit 230 may transmit the freshness condition information to the server 300 according to a particular time cycle (1 minute/1 hour/12 hours/1 day/1 week, and the like).

The server 300 may apply determination logic at step S320. At this time, the freshness condition information transmitted by the plurality of refrigerators may be also applied as a variable of the determination logic. The server 300 may transmit operation instruction information to the refrigerator 100 when it is determined that the freshness has decreased as a result of applying the determination logic at step S335. Here, the operation instruction information may include information for instructing the refrigerator 100 to perform a particular operation because food poisoning or corruption is highly likely to occur. For example, the operation instruction information may instruct the refrigerator 100 to perform a sterilization or deodorization function, or operate in a power mode to lower cooling or freezing temperature or make cooler. Also, the operation instruction information may include time information. The time information may be information for instructing an interval of time for performing the sterilizing or deodorizing function or operating in the power mode and the number of repetitions of the sterilizing or deodorizing function or the power mode. In one embodiment, the operation instruction information may include information for instructing that a process of operating the sterilization, deodorization and power mode for 10 minutes, and then stopping the sterilization, deodorization and power mode for 5 minutes is repeated 16 times. This time information may include an interval that is set so as not to perform an operation for freshness control thereafter. For example, the operation instruction information may include information for instructing that the operation for freshness control is not performed at late night, or the operation for freshness control is performed only up to twice a day.

The operation instruction information may instruct an operation condition different from setup operation condition information set for the refrigerator 100. The freshness context awareness unit 210 of the refrigerator 100 may generate context awareness operating condition information from the received operation instruction information, and the control unit 200 may control the refrigerator according to the generated context awareness operating condition information.

In one embodiment, the control unit 200 may always control the refrigerator according to the context awareness operating condition information. In another embodiment, the control unit 200 may control the refrigerator based on the context awareness operating condition information, and then, may control the refrigerator based on the setup operating condition information, not the context awareness operating condition information for a predetermined period of time (for example, 4 hours). This is to prevent the refrigerator from being controlled under an extremely different condition from the setup operating condition information by the user. In addition, the control unit 200 may control the refrigerator based on the setup operating condition information instead of the context awareness operating condition information at a particular time zone. For example, even when the operation instruction information is received from the server 300 at night (10:00 pm to 6:00 am), the control unit 200 may not apply the operation instruction information.

The server 300 may selectively provide the freshness condition information received at S310 to the portable device 301 corresponding to the refrigerator 100 before proceeding to step S335, and may transmit a message indicating that food poisoning or corruption is highly likely to occur at step S332.

After the step S332, the portable device 301 may generate operation instruction information and request the server 300 to transmit the operation instruction information to the refrigerator 100 at step S334. That is, the server 300 may autonomously transmit the operation instruction information to the refrigerator 100 or may transmit the operation instruction information to the refrigerator 100 at the request of the portable device 310. In addition, the server 300 may transmit the operation instruction information and freshness condition information to the portable device 301 in a message form in real time or according to a predetermined interval at step S390.

In FIG. 3, the server 300 may determine that food poisoning or corruption is highly likely to occur by applying the determination logic. This configuration will be described in more detail.

The server may store a food poisoning index and a corruption index in the database, which are calculated from temperature and humidity on a seasonal basis with respect to a particular region, so as to determine whether or not freshness has decreased. For example, a food poisoning index and corruption index of a relevant region may be calculated on the basis of an administrative unit such as city, county, or province. In another embodiment, a food poisoning index and corruption index of a relevant region may be calculated on the basis of a physical distance.

The food poisoning index and corruption index may be calculated on the basis of the temperature and humidity in various ways. In one embodiment, the following Equations 1 and 2 may be applied.

Food Poisoning Index=$P*185.66+26.14$  [Equation 1]

$P$ (Probability that more than one food poisoning occurs)=$1-\exp(-\exp(A))$ $A$ (The number of occurrences)=$-4.4946*0.0701$ Temperature (° C.)*0.0152 Humidity (%)

Corruption index=$((\text{Humidity (\%)}-65)/14)*1.054\char`^\text{Temperature (° C.)}$  [Equation 2]

In addition to the above Equations 1 and 2, the food poisoning index and corruption index may be calculated on the basis of temperature and humidity in various ways. Further, respective variables of Equations 1 and 2 may be updated in real time or according to a predetermined cycle considering a region where the refrigerator is located or environmental characteristics of the year. In this case, the food poisoning index and the corruption index may be calculated differently even though the sensed values are equal, and new context awareness operating condition information and operation instruction information may be generated therethrough.

The server may determine that possibility of decrease in the freshness based on the food poisoning index, corruption index, and the like, and may transmit operation instruction information for instructing the refrigerator to operate in a particular mode to the refrigerator when freshness is decreasing or a decrease in freshness is continued.

Figure 4:
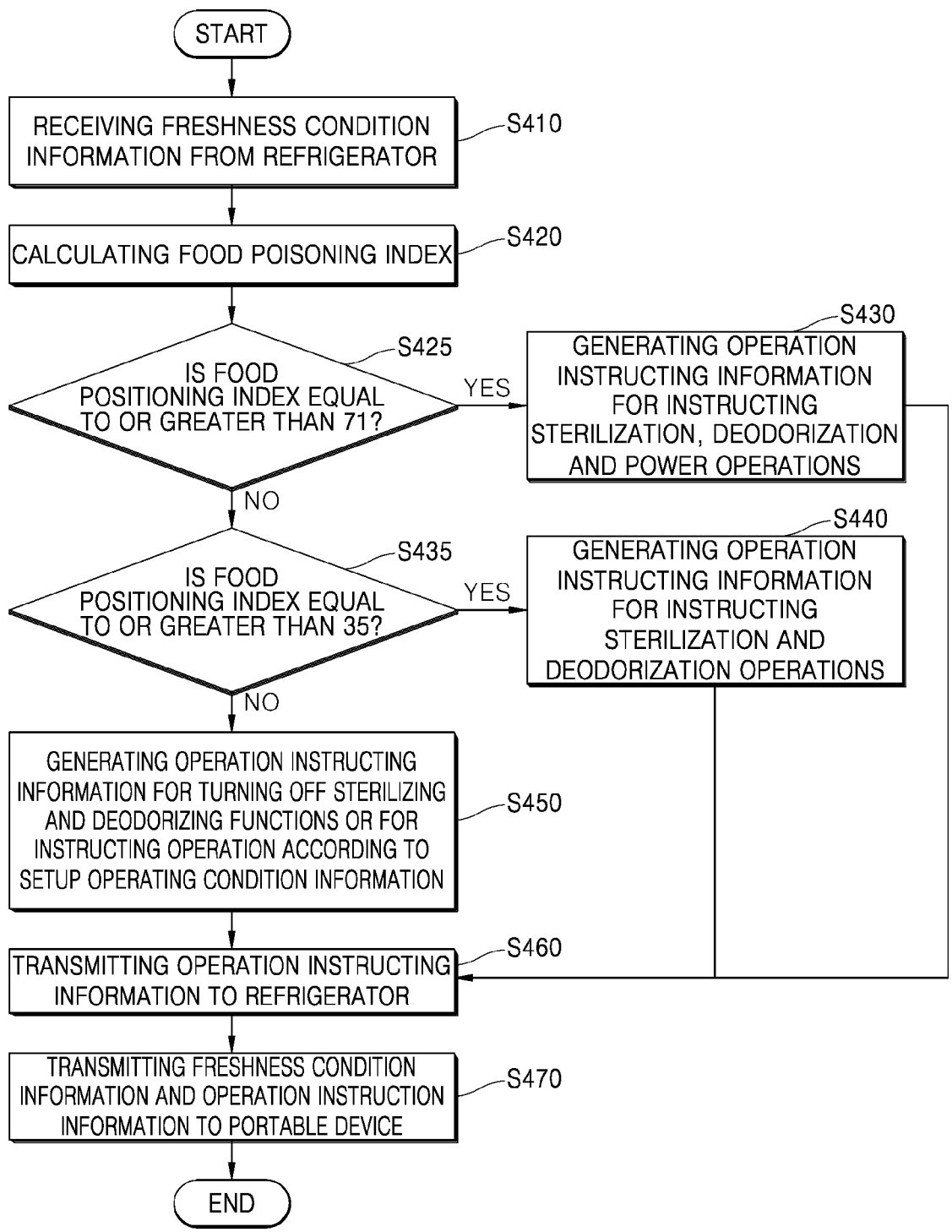
FIG. 4 is a view showing an operation process when a server determines that freshness has decreased according to one embodiment of the present invention.

FIG. 4 is a view showing an operation process when a server determines that freshness has decreased according to one embodiment of the present invention.

When the above-described Equation 1 is applied, the server may use the food poisoning index as a criterion for determining whether or not freshness decreases. The server may receive freshness condition information such as temperature and humidity from the refrigerator at step S410. The food poisoning index may be calculated by using the received temperature and humidity at step S420. When the food poisoning index exceeds 71 as a result of calculation at step S425, food poisoning may be very likely to occur, and thus the possibility of a decrease in the freshness may be greatly increased, so that the server may generate operation instruction information for instructing operations such as sterilization, dehumidification and deodorization, and an operation in a power mode (power operation), and the like at step S430. The power operation may mean an operation of cooling or freezing by using a temperature lower than a set temperature as a target temperature. Alternately, a rapid cooling and rapid freezing mode may be applied to another embodiment.

When the food poisoning index is equal to or more than 35 and less than 70 at step S435, food poisoning may be likely to occur, so that the server may generate operation instruction information for instructing operations such as sterilization, dehumidification and deodorization at step S440. Conversely, when the food poisoning index is less than 35, the refrigerator may not require any other operation, so that functions such as sterilization, dehumidification, deodorization and the like may be turned off or operation instruction information for instructing an operation according to the setup operating condition information may be generated at step S450. Then, the server may transmit the operation instruction information generated at the steps S430, S440 and S450 to the refrigerator at step S460, and may selectively transmit the freshness condition information and operation instruction information to the portable device at step S470. When the food poisoning index is less than 35 at step S435, the server may be configured so as not to transmit a message or information to the refrigerator and the portable device.

Figure 5:
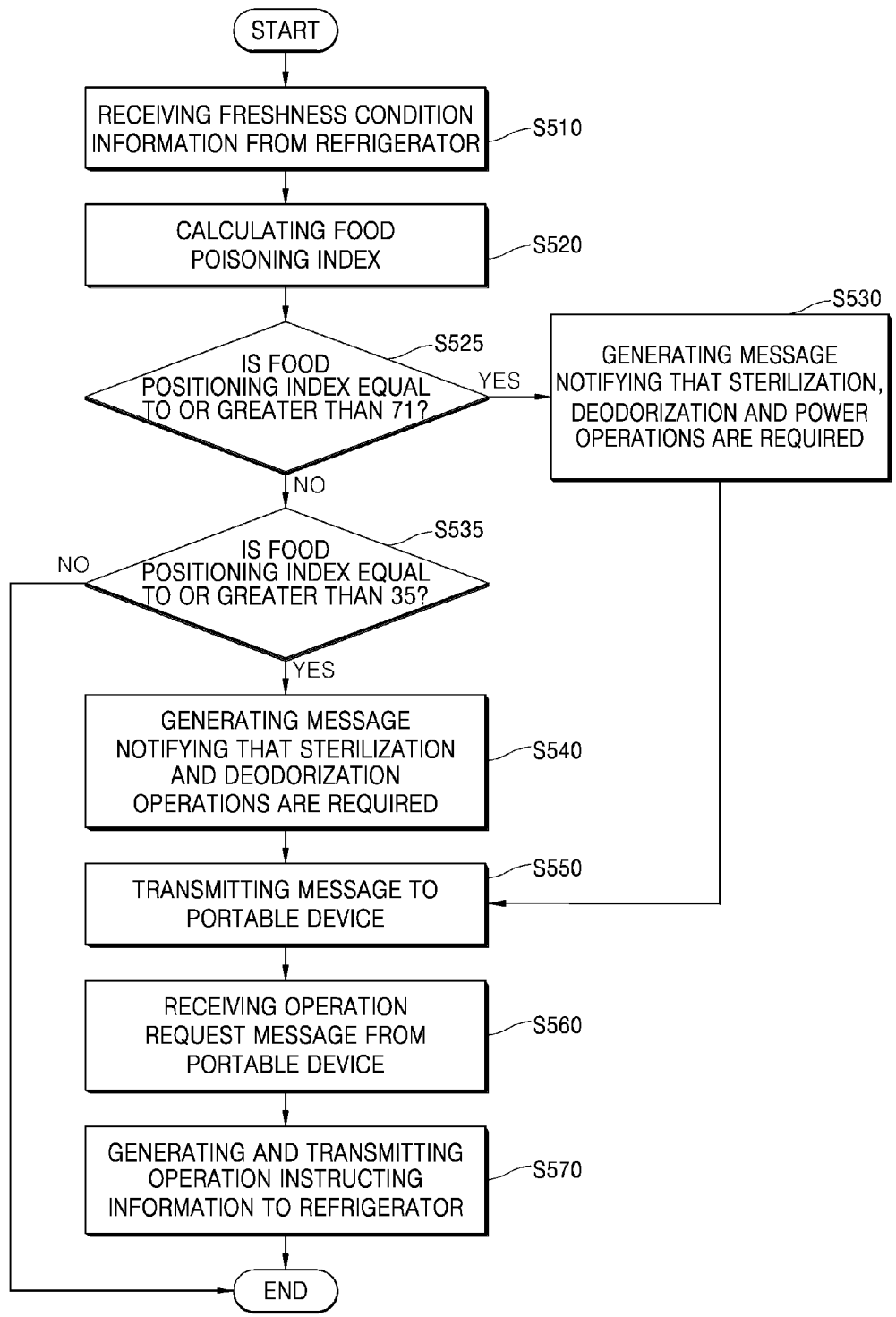
FIG. 5 is a view showing an operation process when a server determines that freshness has decreased according to another embodiment of the present invention.

FIG. 5 is a view showing an operation process when a server determines that freshness has decreased according to another embodiment of the present invention. Unlike FIG. 4, FIG. 5 shows a process in which the server is requested to perform an operation corresponding to the freshness condition information from the portable device.

The server may receive the freshness condition information from the refrigerator at step S510, and may calculate a food poisoning index at step S520. The steps of S510 and S520 may be the same as the steps S410 and S420 of FIG. 4 described above. When the food poisoning index exceeds 71 as a result of calculation at step S525, the food poisoning is very likely to occur, and thus the possibility of a decrease in the freshness may be greatly increased, so that the server may generate a message notifying that operations such as sterilization, dehumidification and deodorization, and an operation in a power mode (power operation) are required at step S530. And, when the food poisoning index is equal to or more than 35 and less than 70 at step S535, the food poisoning is very likely to occur, and thus the possibility of a decrease in the freshness may be increased, so that the server may generate a message notifying that operations such as sterilization and deodorization are required at step S540. Conversely, when the food poisoning index is less than 35, the refrigerator may not require any other operation, and thus the process may be terminated.

The server may transmit the messages generated at the steps S530 and S540 to the portable device corresponding to the refrigerator at step S550. Then, the server may receive an operation request message from the portable device at step S560. According to the received operation message, the server may generate operation instruction information and transmit the operation instruction information to the refrigerator at step S570. As a result, the refrigerator may selectively perform the sterilization, dehumidification and deodorization operations, and the power operation according to the received operation instruction information.

FIG. 5 may be different from FIG. 4 in that the server transmits the operation instruction information to the refrigerator after receiving the operation request message from the portable device.

Alternatively, when a possibility of a decrease in freshness occurs, there may be an engagement between the server and the portable device so that the server transmits operation instruction information corresponding to an external condition to the refrigerator.

The server may calculate information such as the food poisoning index and the corruption index every year or every month in accordance with Equations 1 and 2 so as to retain cumulative information on time at which a possibility of a decrease in freshness occurs. For example, even when the temperature and humidity are temporarily low in periods such as July and August, the server may determine that there is a possibility of a decrease in freshness by means of a past history.

In addition, when the food poisoning index is less than 35 at step S535, the server may be configured so as not to transmit a message or information to the portable device.

Figure 6:
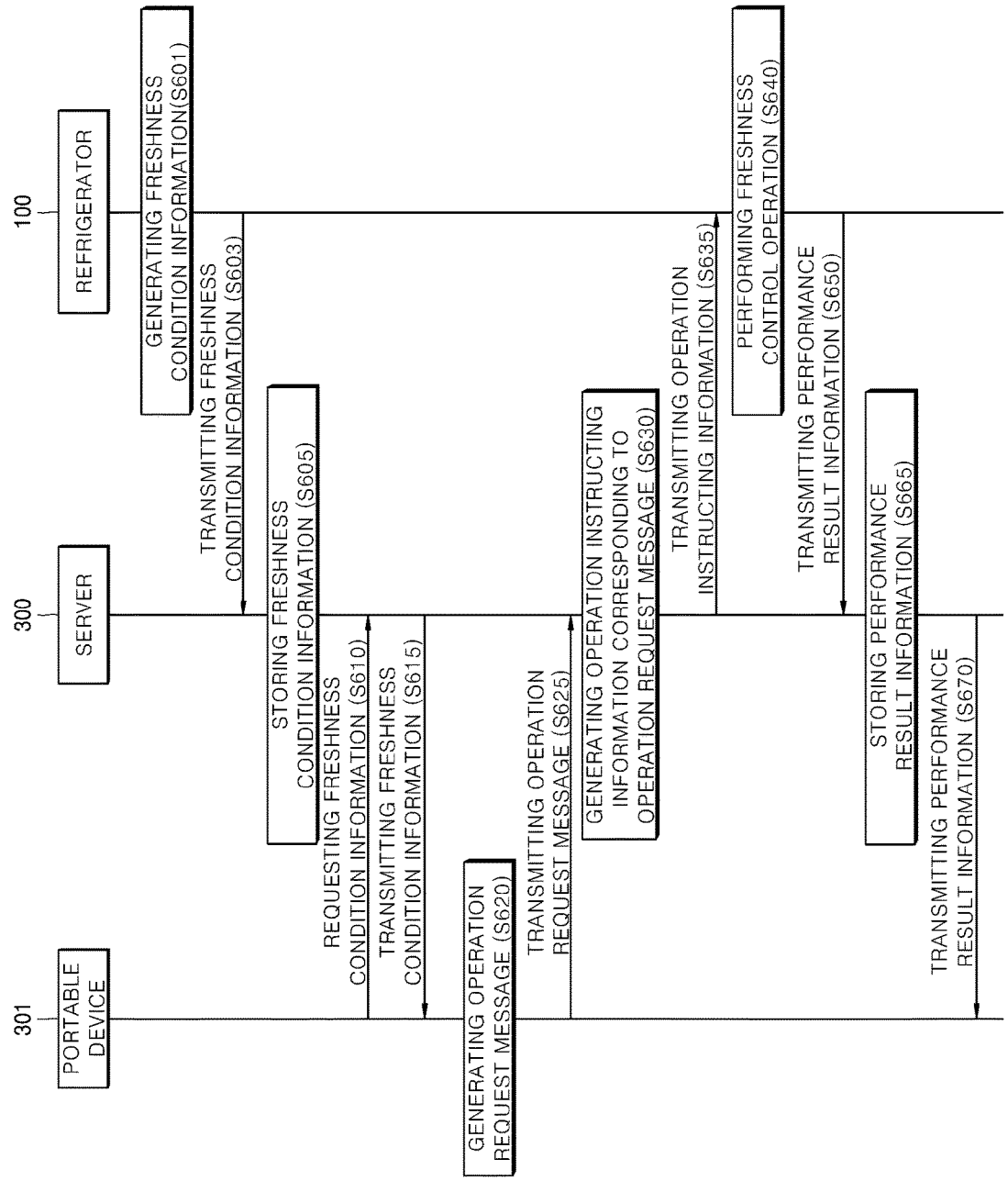
FIG. 6 is a view showing a process in which a portable device controls freshness of a refrigerator according to one embodiment of the present invention.

FIG. 6 is a view showing a process in which a portable device controls freshness of a refrigerator according to one embodiment of the present invention. FIG. 6 shows a process in which the portable device 301 generates an operation request message and transmits the operation request message to the server 300, and the server 300 generates operation instruction information corresponding to the operation request message and transmits the operation instruction information to the refrigerator 100.

The refrigerator 100 may generate freshness condition information according to a predetermined cycle at step S601 and transmit the freshness condition information to the server 300 at step S603. The server 300 may store the received freshness condition information for each refrigerator at step S605. Thereafter, when the portable device 301 makes a request for freshness condition information to the server 300 at a particular time point at step S610, the server 300 may search a database for the freshness condition information of the refrigerator 100 corresponding to the portable device 301 and transmit the freshness condition information to the portable device 301 at step S615. The portable device 301 may generate an operation request message for freshness control on the basis of the received freshness condition information at step S620, and then may transmit the operation request massage to the server 300 at step S625. The server 300 may generate operation instruction information corresponding to the received operation request message at step S630, and may transmit the generated operation instruction information to the refrigerator 100 at step S635. The refrigerator 100 may perform a freshness control operation according to the received operation instruction information at step S640, and may transmit information on a performance result to the server 300 at step S650. Then, the server 300 may store the performance result information in an internal database at step S665, and may transmit the performance result information to the portable device 301 at the request of the portable device 301 or in real time at step S670. A configuration of FIG. 6 may correspond to a process of performing the step S335 through the steps S332 and S334 illustrated in FIG. 3.

In FIG. 6, the server 300 may provide the freshness condition information to the portable device 301 through a push message without the request described in connection with the step S610.

Figure 7:
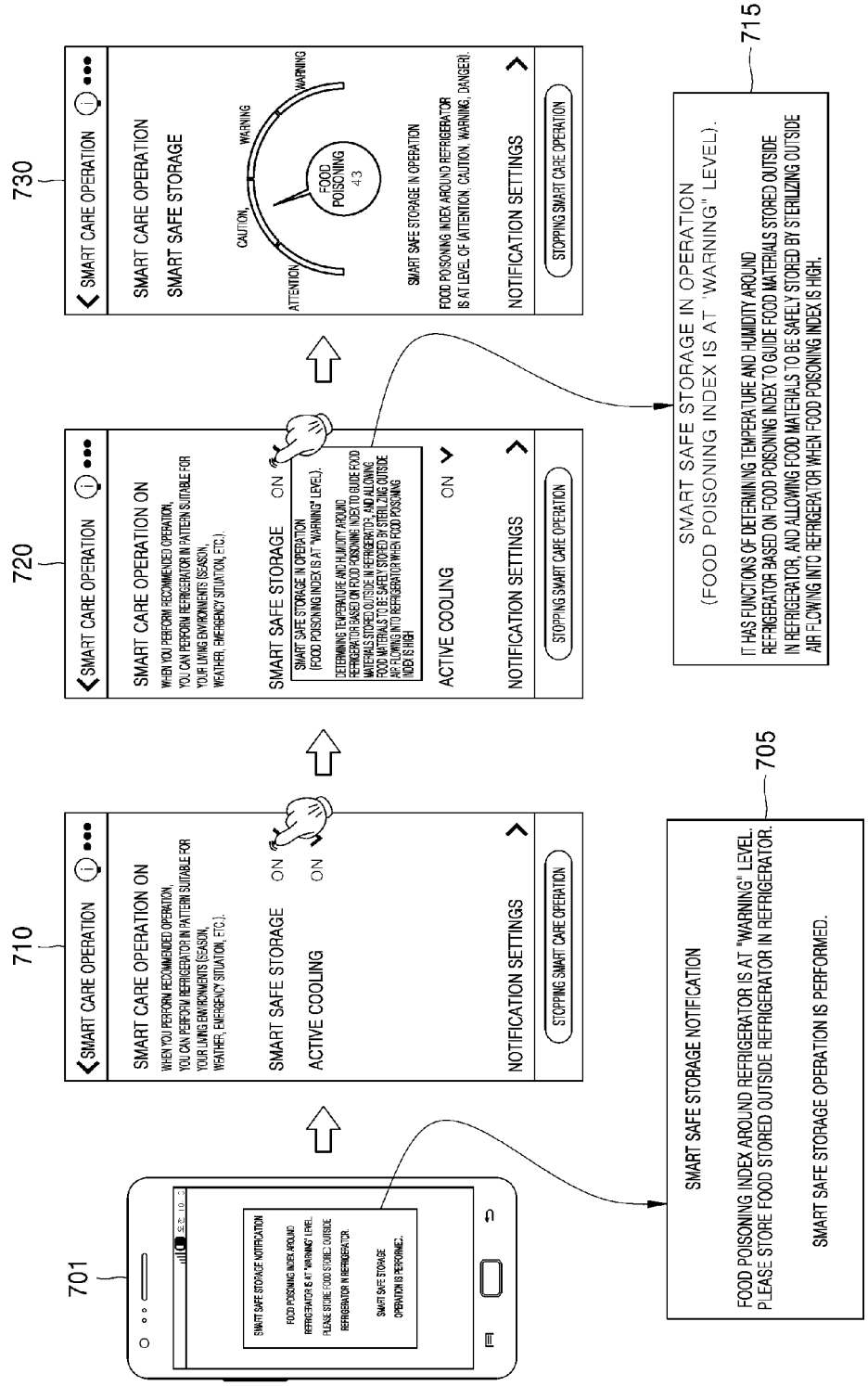
FIG. 7 is a view showing a screen of an application installed so that a portable device controls freshness of a refrigerator according to one embodiment of the present invention.

FIG. 7 is a view showing a screen of an application installed so that a portable device controls freshness of a refrigerator according to one embodiment of the present invention.

701 is a screen of a smart phone, which is one embodiment of a portable device, for displaying a freshness condition of a refrigerator through a push message. In one embodiment, the push message may be displayed on the screen under the heading "Smart Safe Storage Notice" so as to display the freshness condition of the refrigerator on the portable device. The displayed contents may indicate whether the food poisoning index is at a level of "warning" or "dangerous" according to humidity and temperature, which are main criteria for freshness. In addition to controlling the temperature in the refrigerator according to the freshness condition, it is also possible to include a content notifying the user that food needs to be stored in the refrigerator in the push message. The user may check the push message including contents shown in 705 and execute an application named "Smart Care Operation". Then, the user may select an item indicated as "Smart Safe Storage" to check items for controlling freshness in detail as shown in 720. A state of the refrigerator may be displayed as shown in 720 so that the user controls the freshness by using the screen of the portable device. 720 shows that the refrigerator is in operation to control the freshness. At this time, the operation of the refrigerator may mean that the refrigerator operates at an operating condition different from the setup operating condition information that is set for the refrigerator. For example, even when the refrigerator is in a state in which the sterilization/dehumidification/deodorization/ power cooling is not selected in the setup operating condition information of the refrigerator, or the refrigerator is not at a time point to perform the sterilization/dehumidification/ deodorization/power cooling, it is possible to display that the refrigerator is performing an additional operation to control the freshness. In more detail, it is possible to check the freshness condition information of the current refrigerator as shown in 715. In one embodiment, the food poisoning index may be calculated by using temperature information and humidity information calculated from temperature and humidity outside or inside the refrigerator, and a level of the calculated food poisoning index may be determined in a range of a value calculated from Equation 1. In one embodiment, when the food poisoning index is in a range of 10 to 35, it is possible to display the word "Attention" indicating a low possibility of food poisoning on the portable device in 715. Also, when the food poisoning index is in a range of 35 to 50, it is possible to display the word "Caution" indicating that a possibility of food poisoning is at an intermediate level in 715, so that it is necessary to take caution so as to prevent food poisoning. In response thereto, the refrigerator may perform a cooling operation at a lower temperature or selectively perform sterilization/dehumidification/deodorization.

In addition, a possibility of food positing may be high in a range of 50 to 80, so that the portable device may be displayed with the word "Warning." In response thereto, the refrigerator may operate at a target temperature which is a low temperature, or may obligatorily perform sterilization/ dehumidification/deodorization. A possibility of food poisoning may be very high in a range of 85 or more, so that the portable device may be displayed with the word "Danger," and the refrigerator may lower cooling or freezing temperature, or may obligatorily perform sterilization/dehumidification/deodorization. When the portable device is displayed with "Warning" or "Danger," the entire screen may be blinked or an alarm sound may be generated.

The aforementioned various states (attention, caution, warning, danger) of the refrigerator may be checked on the portable device, as shown in 720 and 730. As shown in 730, it is possible to check freshness condition information of the application through a visual graph. In one embodiment of the visual graph, a state of the refrigerator may be divided into attention/caution/warning/danger states according to the food poisoning index or the corruption index, and a relevant region may be displayed through the above-described states. In addition, "ON" may be displayed in a portion indicated as "Smart Safe Storage" in 710, 720, and 730, and thus it is possible to check that the current refrigerator is controlling the freshness.

Figure 8:
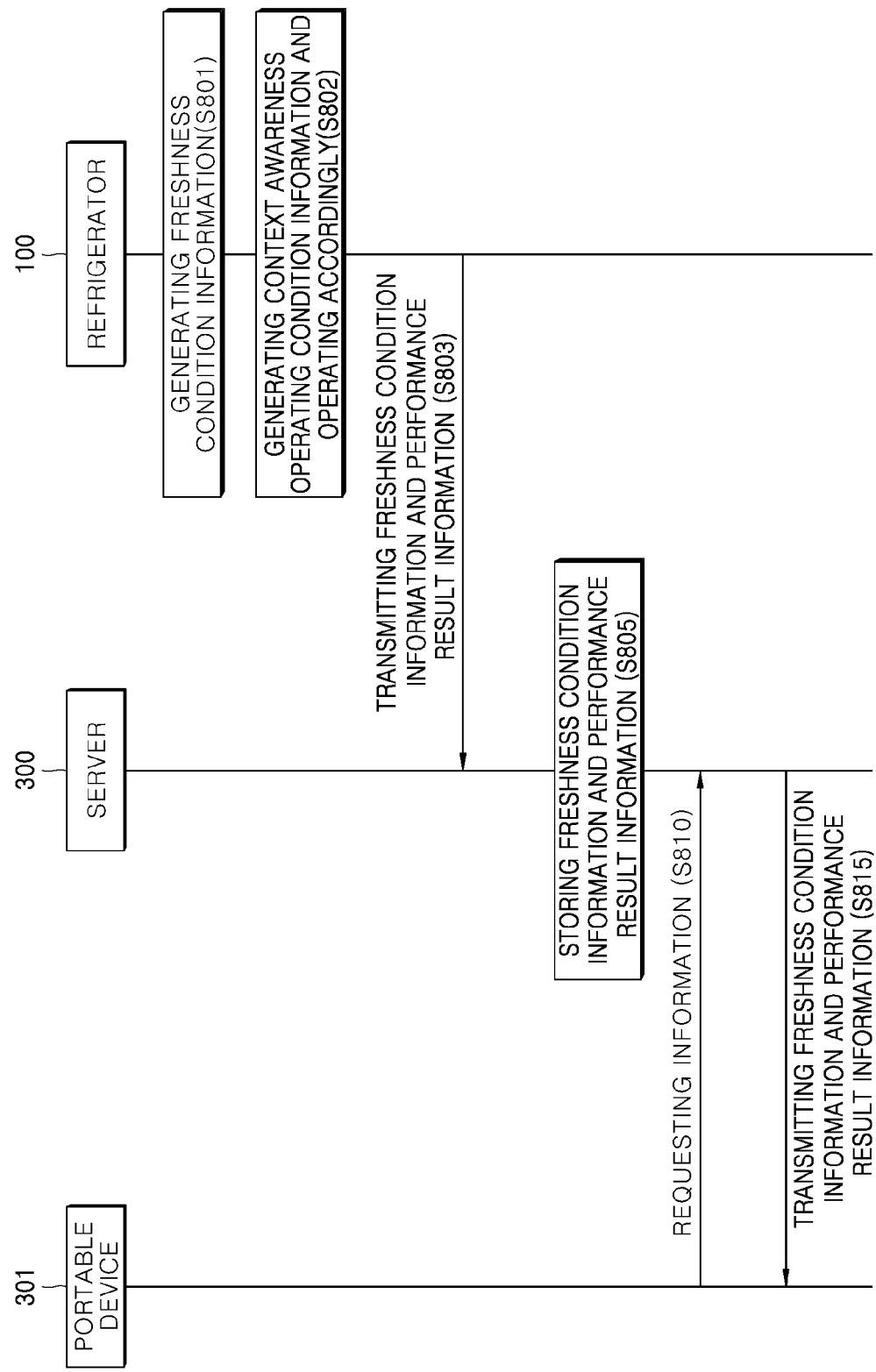
FIG. 8 is a view showing a process in which a portable device controls freshness of a refrigerator according to another embodiment of the present invention.

FIG. 8 is a view showing a process in which a portable device controls freshness of a refrigerator according to another embodiment of the present invention. Unlike the embodiment described with reference to FIG. 6, FIG. 8 is a view showing a process in which the refrigerator performs a freshness control operation in a context-aware manner, and notifies the server 300 of such an operation.

The refrigerator 100 may generate freshness condition information sensed by the freshness sensors at step S801, and accordingly the freshness context awareness unit of the refrigerator may generate context awareness operating condition information, and the control unit of the refrigerator 100 may operate accordingly at step S802. And, the refrigerator 100 may transmit the freshness condition information and performance result information to the server 300 at step 803. The performance result information may be provided as a type of notification message. That is, the step S803 is one embodiment of a process of transmitting a fact that the communication unit of the refrigerator 100 has performed the freshness control operation based on the context awareness operating condition information to the server or the portable device, which is an external device, through a notification message.

The server 300 may store the freshness condition information and performance result information in a database at step S805. When the portable device 301 make a request for information to the server 300 at step S810, the server 300 may transmit the freshness condition information and performance result information, which is a result of the operation of the refrigerator 100, to the portable device 301 at step S815. The portable device 301 may display an operating situation or freshness condition of the refrigerator as shown in FIG. 7. Thereafter, in order to control the refrigerator 100, the portable device 301 may perform a process subsequent to the step S620 of FIG. 6. In this process, the server 300 may provide new operation instruction information instead of the context awareness operating condition information generated by the refrigerator in a context-aware manner to the refrigerator 100 to control the operation of the refrigerator 100.

The freshness context awareness unit 210 of the refrigerator 100 may generate the context awareness operating condition information by comparing the operation instruction information provided from the outside with the setup operating condition information set for the refrigerator. For example, when the operation instruction information instructs a power operation, the refrigerator 100 may perform a power operation of relatively lowering a temperature thereof to a temperature of −3 degrees on the basis of the preset setup operating condition information, or perform a power operation at an absolute target temperature of −1 degree.

In FIG. 8, the freshness context awareness unit 210 of the refrigerator 100 may determine the freshness by using Equations 1 and 2 described above. The freshness context awareness unit 210 may use the logic of the servers of FIGS. 4 and 5.

The freshness context awareness unit 210 of the refrigerator may generate context awareness operating condition information that allows the refrigerator to operate by reflecting freshness condition information checked by the refrigerator itself, freshness condition information of a relevant region provided by the server, or operation instruction information provided by the server. In particular, the freshness may be properly controlled according to a condition of the refrigerator by comparing the operation instruction information provided by the portable device or the server, the setup operating condition information set for the refrigerator itself and the freshness condition information around the refrigerator confirmed by the refrigerator.

Figure 9:
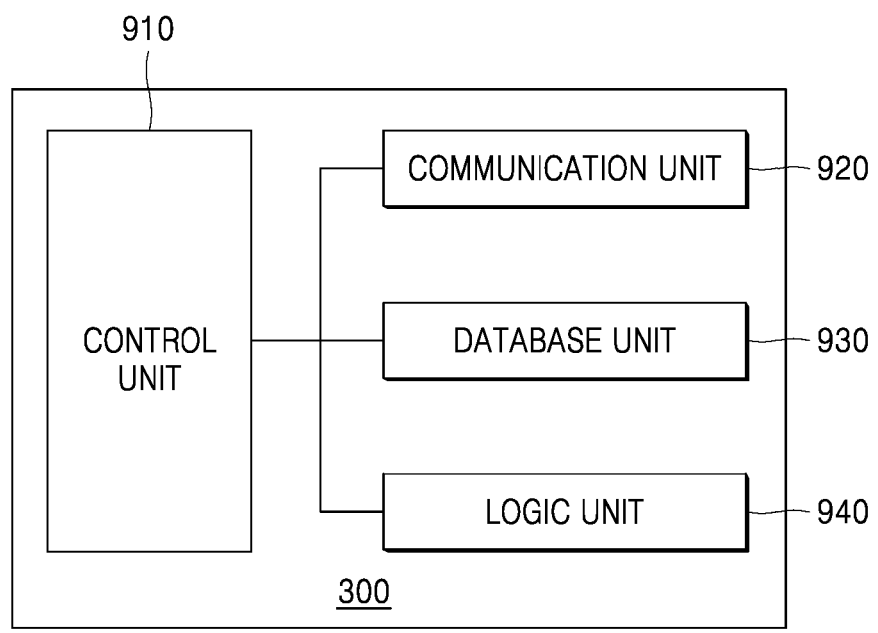
FIG. 9 is a view showing a configuration of a server according to one embodiment of the present invention.

FIG. 9 is a view showing a configuration of a server according to one embodiment of the present invention. The server 300 may include a control unit 910, a communication unit 920, a database unit 930, and a logic unit 940.

The communication unit 920 may communicate with the refrigerator and the portable device. The database unit 930 may store freshness condition information of the refrigerator received from the refrigerator. Of course, the database unit 930 may store the freshness condition information from a plurality of refrigerators, not one refrigerator. Also, it is possible to provide data used to more accurately monitor the freshness context to the control unit 910 and the logic unit 940 by storing data during a predetermined period of time or external data. The logic unit 940 may generate operation instruction information required for the refrigerator to operate by using the received freshness condition information and information stored in the database unit 930. At this time, the logic unit 940 may determine a possibility of a decrease in freshness by using temperature and humidity as shown in Equations 1 and 2 described above. The control unit 910 may control the communication unit 920, the database unit 930, and the logic unit 940 described above. Also, the control unit 910 may control the communication unit 920 to transmit the operation instruction information generated by the logic unit 940 to the refrigerator.

The logic unit 940 may store conditions for the freshness control operation of the refrigerator by using the freshness condition information that is received by the communication unit 920 from the plurality of refrigerators for a predetermined period of time and is stored in the database unit 930. For example, the logic unit 940 may newly calculate the food poisoning index or the corruption index by reflecting additional variables other than temperature and humidity on the freshness condition information.

As shown in FIGS. 6 and 8, the communication unit 920 may transmit the freshness condition information received from the refrigerator and the performance result information of the refrigerator to the portable device 301, and may receive an operation request message from the portable device 301.

Figure 10:
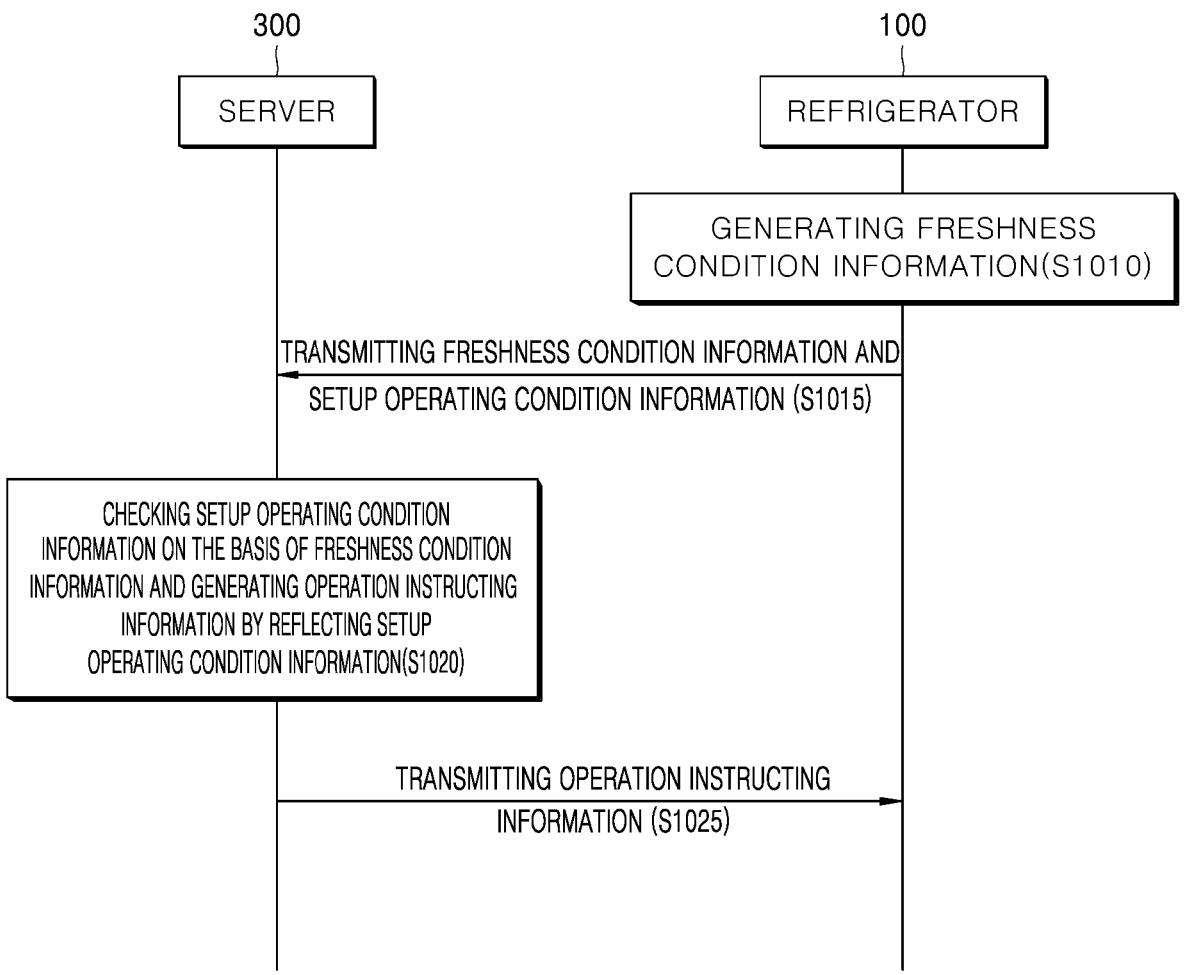
FIG. 10 is a view showing a process in which a server provides operation instruction information suitable for a refrigerator 100 according to one embodiment of the present invention.

FIG. 10 is a view showing a process in which a server provides operation instruction information suitable for a refrigerator 100 according to one embodiment of the present invention.

The refrigerator 100 may transmit the freshness condition information and the setup operating condition information set for the refrigerator 100 to the server 300. The server 300 may compare the freshness condition information of the refrigerator with the setup operating condition information on the basis of the received information to determine whether or not the operation of the refrigerator 100 according to the setup operating condition information is an appropriate response operation for the current freshness condition. For example, according to the temperature and humidity included in the current freshness condition information, operations such as sterilization, dehumidification and deodorization may be required. When the operations are not included in the setup operating condition information, the server 300 may generate operation instruction information including the above-described operations at step S1020. According to another embodiment, the server 300 may generate operation instruction information so that the refrigerator operates at a temperature lower than a temperature set by the setup operating condition information. The server 300 may transmit the generated operation instruction information to the refrigerator 100 at step S1025, and the refrigerator 100 may operate on the basis of the received operation instruction information.

In FIG. 10, the server 300 may provide the operation instruction information to the refrigerator 100 in a customized manner without collectively providing the operation instruction information to all the refrigerators, which means that the server 300 may provide the operation instruction information reflecting current conditions under which the refrigerator 100 is operating.

Also, in FIG. 10, the portable device 301 instead of the server 300 may directly communicate with the refrigerator 100.

In FIGS. 9 and 10, when the communication unit 920 of the server 300 receives the setup operating condition information from the refrigerator 100, the logic unit 940 of the server 300 may generate operation instruction information by reflecting the setup operating condition information that is an individual operating condition of the refrigerator 100.

Hereinafter, in the portable device according to one embodiment of the present invention, an interface for checking freshness information, and controlling a condition of the refrigerator using the same or checking a result of controlling will be described.

As described above, the freshness condition information may be based on sensed external factors such as humidity, temperature and the like that affect the freshness of the food by using the sensors included in the refrigerator 100, and the refrigerator may be controlled according to a result of sensing.

Figure 11:
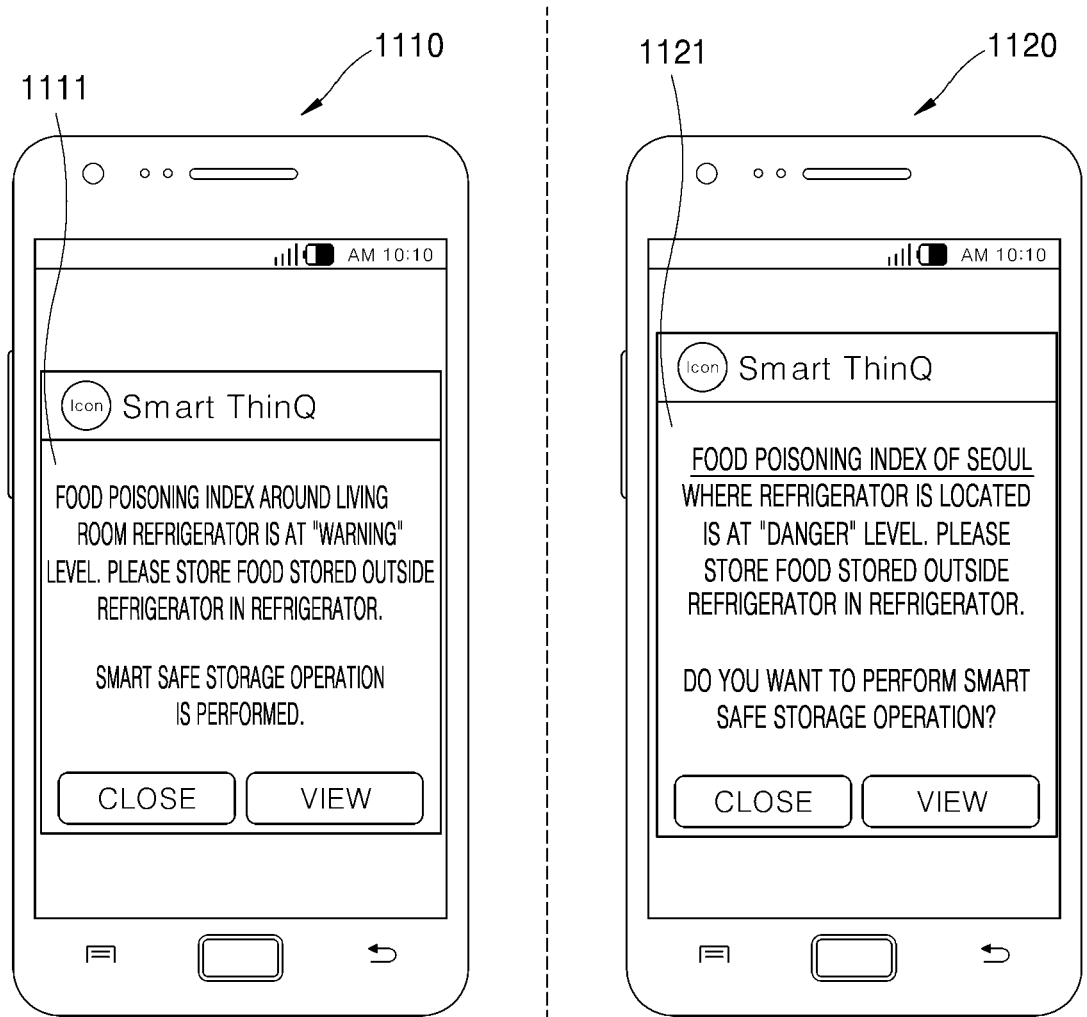
FIG. 11 is a view showing an interface in which freshness condition information and operation instruction information are displayed on a portable device according to one embodiment of the present invention.

FIG. 11 is a view showing an interface of a portable device in which freshness condition information and operation instruction information are displayed according to one embodiment of the present invention.

In FIG. 4, the server may perform a series of processes of calculating a food poisoning index based on the freshness condition information received from the refrigerator, and transmitting operation instruction information to the refrigerator. In addition, the server may transmit the freshness condition information and operation instruction information to the portable device corresponding to the refrigerator at step S470. This configuration will be described in more detail.

In response to the step S470 of FIG. 4, 1110 shows a screen in which the portable device receives the freshness condition information and operation instruction information from the server. Information on the food poisoning index around the set refrigerator may be displayed on the screen, and action tips required for the user may be displayed together. For example, as in 1111, "A food poisoning index around the refrigerator is at a warning level, and please store food stored outside the refrigerator in the refrigerator."

Further, the operation instruction information may also be displayed. As shown in a lower portion of 1111, a message described as "Smart safe storage operation is performed" may be output to display that operations such as sterilization, dehumidification, deodorization, power cooling and the like are being performed so that the refrigerator maintains freshness.

The message 1111 displayed on 1110 may be configured differently depending on how the server determines the food poisoning index of the refrigerator. For example, when the food poisoning index in a relevant region as well as the index around the refrigerator becomes generally higher, the user may be notified.

In FIG. 5, when the server receives an operation request message from the portable device while calculating the food poisoning index at step S560, the server may provide the operation instruction information to the refrigerator. This configuration is applicable when the user has not set up a smart safe storage operation or a freshness condition of a relevant region is worse than a freshness condition around the user's refrigerator. In this case, since the freshness condition around the refrigerator is not bad, a warning may be given to the user. But, only when the user selects to perform the smart safe storage operation, the refrigerator may be configured to receive the operation instruction information including the smart safe storage operation and perform the smart safe storage operation.

In one embodiment, 1120 may display a message as shown in 1121 by using the food poisoning index of a region where the refrigerator is located (based on a particular radius range) that is calculated by the server or information provided by a weather server operated by the Meteorological Agency, the Environment Agency or the like. 1121 may output a message indicating that the food poisoning index in the region where the refrigerator is located, for example, Seoul, has reached a "dangerous" level, and may notify the user that it is required to keep food under refrigeration. At this time, unlike 1110, a message described as "Do you want to perform a smart safe storage operation?" may be output to allow the portable device to transmit the operation request message to the server as in the step S560 of FIG. 2.

Figure 12:
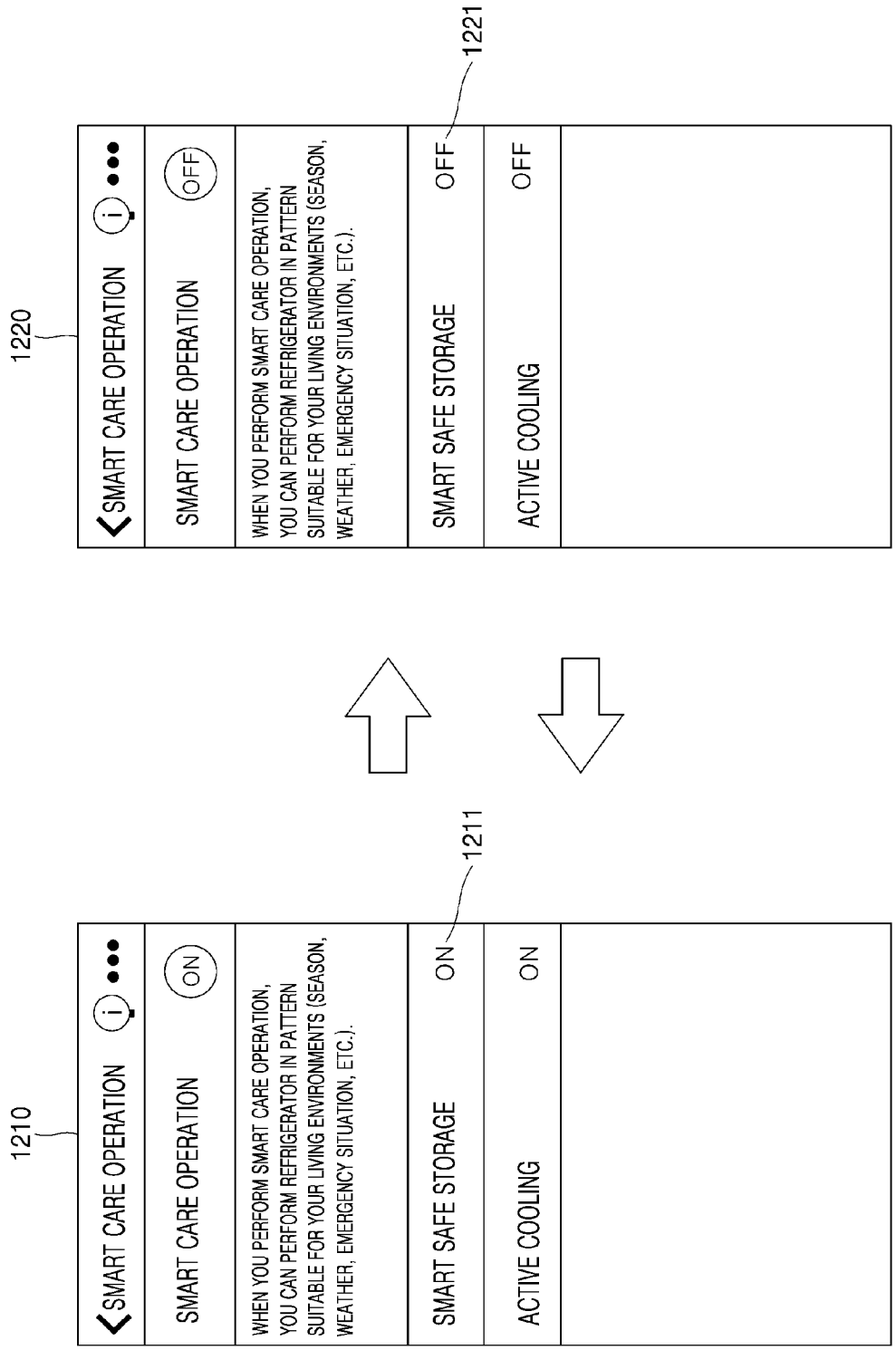
FIG. 12 is a view showing a detailed control screen of a portable device according to one embodiment of the present invention.

FIG. 12 is a view showing a detailed control screen of a portable device according to one embodiment of the present invention. Two interfaces are described above with reference to FIG. 11. FIG. 12 shows screens displayed to correspond to 1110 and 1120. In 1110 of FIG. 11, "View" is selected, it is displayed that the smart safe storage operation, that is, an operation different from the setup operating condition information, is currently performed in a context-awareness manner so as to maintain freshness, as shown in 1211. When a portion indicated by 1221 is selected to check the operation history of the refrigerator, the screen may be configured as shown in 720 of FIG. 7.

When a portion indicated by 1211 is touched to stop the operation of the refrigerator that is performed according to the operation instruction information different from the setup operating condition information, for example, to stop the operation named "Smart Safe Storage" in 1210, the portion may be displayed as "OFF", as shown in 1221 of 1220 on the right side.

When "View" is selected in 1120 of FIG. 11, a screen for controlling the refrigerator from the outside may be displayed in order to maintain freshness through the portable device as shown in 1220 of FIG. 12. As shown in 1221, "Smart Safe Storage" may be displayed as "OFF". Detailed settings of the smart safe storage operation may be adjusted by selecting a portion indicated by 1221. Alternately, by touching the portion indicated by 1221, "OFF" may be changed to "ON" as shown in 1211 of 1210.

Figure 13:
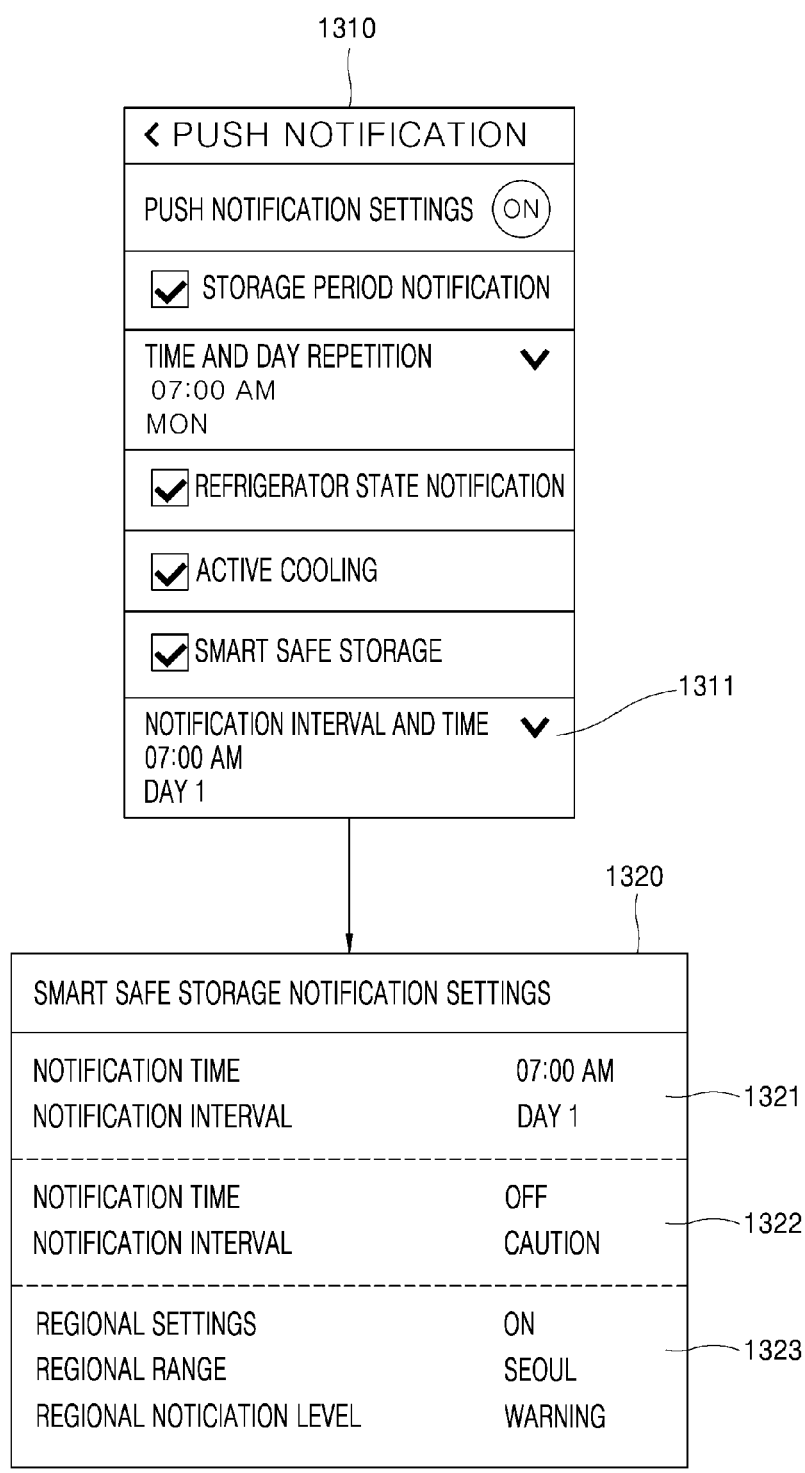
FIG. 13 is a view showing an interface for setting a notification interval according to one embodiment of the present invention.

FIG. 13 is a view showing an interface for setting a notification interval according to one embodiment of the present invention.

The portable device may include various functions for controlling the refrigerator, and among these, a notification interval and time for "Smart Safe Storage" may be checked as shown in 1311. Also, detailed notification settings may be selected as shown in 1320. It is possible to control a detailed item notification setting interface by touching an area indicated by 1311, as shown in 1320.

Referring to 1320, a portion for setting notification time may be presented. As shown in 1321, the notification time and notification interval may be set. Also, as shown in 1322, detailed notification information may be set. A night notification may be set by selecting ON/OFF, and a level for determining the notification may be also set. Here, the level for determining the notification may be a level to monitor a freshness condition around the refrigerator and set a stage at which a notification message is to be transmitted to the portable device. This level may be set in a portion indicated by "Refrigerator Outdoor Air Notification Level". Among the above-described attention/caution/warning/danger levels, the notification level of the refrigerator may be determined.

In the embodiments of the present invention, the notification may be set to reflect not only a freshness condition of outdoor air (or ambient air) around the refrigerator but also a freshness condition of a region (e.g., city) where the refrigerator is located. As shown in 1323, it is possible to set whether or not to receive the notification with respect to a freshness condition of a relevant region. Also, it is possible to set a regional range. The regional range may be set based on a city or country in a broad manner, and may be set as a sub-administrative unit such as a city or a province in a narrow manner. In addition, it is possible to input geographical information such as a radius of 5 km from a location of the refrigerator instead of an administrative region so as to set the regional range. This configuration may allow a plurality of refrigerators to monitor the freshness condition of the outdoor air. Therefore, it is possible to receive the notification by setting the regional range so as to reflect freshness information provided by refrigerators within a certain range (physical distance or administrative division range) and freshness information operated by an external organization. It is possible to determine a level of a regional notification in relation to regional settings. FIG. 13 shows an interface set as "Warning". The level of the regional notification is also applicable in the same manner as the refrigerator outdoor air notification level of 1322.

Figure 14:
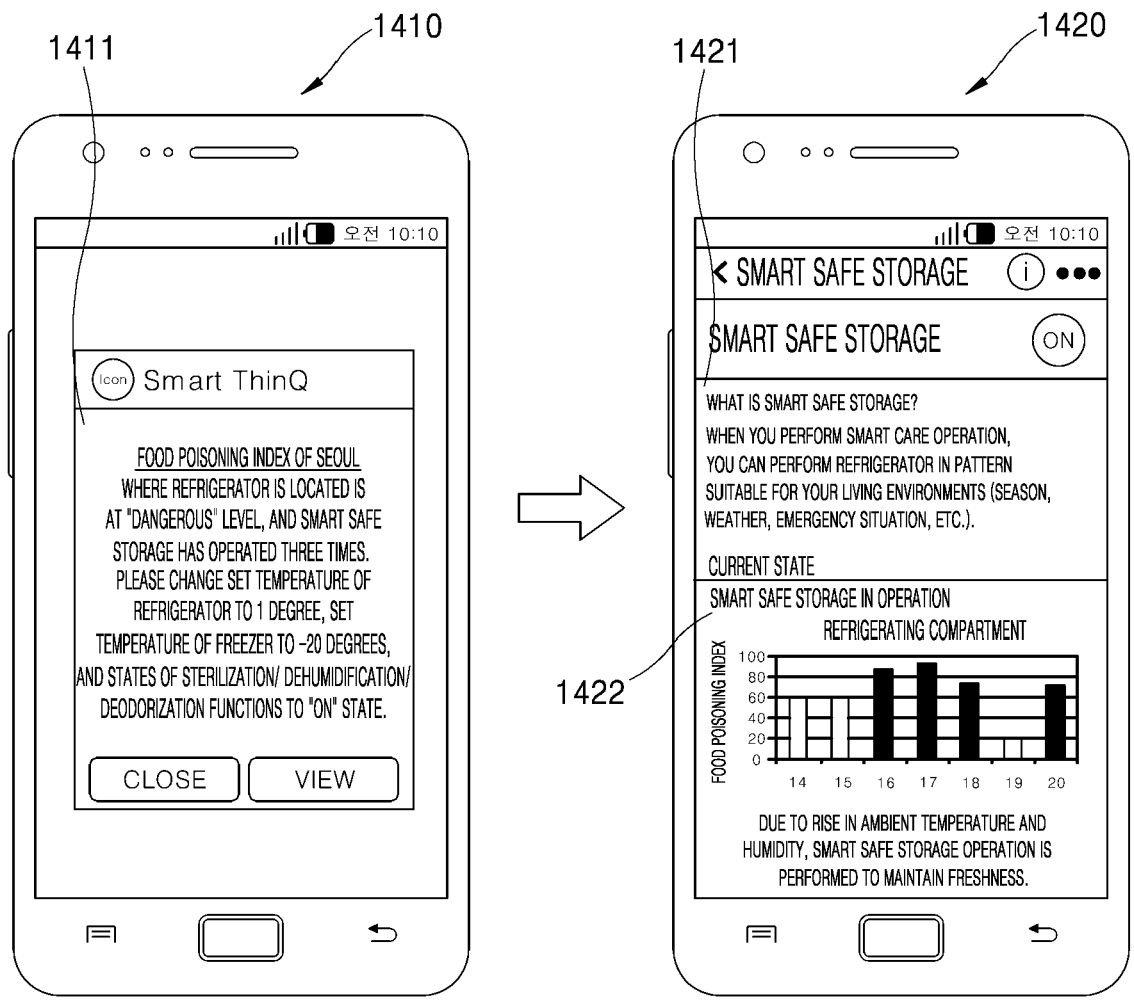
FIG. 14 is a view showing freshness condition information and performance result information of a refrigerator displayed on a portable device according to one embodiment of the present invention.

FIG. 14 is a view showing freshness condition information and performance result information of a refrigerator displayed on a portable device according to one embodiment of the present invention.

In 1410 and 1411, the portable device may display a message indicating that the food poisoning index of the region where the refrigerator is located has reached a "danger" state, and accordingly the refrigerator has operated three times unlike a condition set to maintain freshness. Also, since the setup operating condition information that is preset for the refrigerator is different from the context awareness operating condition information in which the refrigerator has operated in response to a change in freshness, a message requesting the portable device to change the setup operating condition information may be output. For example, a message requesting to change a preset temperature and to keep the sterilization/dehumidification/deodorization functions related to freshness in an "ON" state may be displayed.

When a view button is selected in order to check history information in more detail in the portable device, a screen including a detailed interface may be displayed as shown in 1421 of 1420. The user may check information on the freshness control operation named "Smart Safe Storage" through the portable device. As shown in 1422, freshness condition information may be accumulated and displayed, so that the user may change the setup operating condition information through the portable device or the interface of the refrigerator due to a poor freshness condition.

Figure 15:
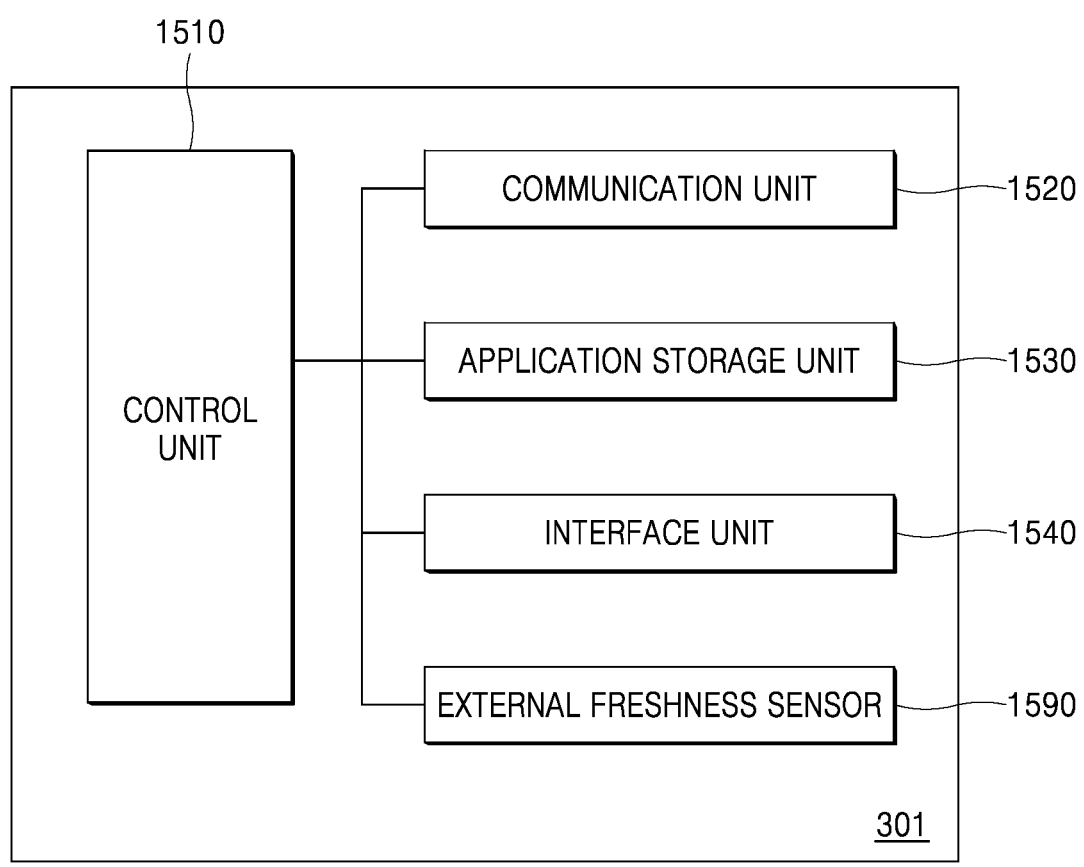
FIG. 15 is a view showing a configuration of a portable device according to one embodiment of the present invention.

FIG. 15 is a view showing a configuration of a portable device according to one embodiment of the present invention. The portable device 301 may include a control unit 1510, a communication unit 1520, an application storage unit 1530, and an interface unit 1540. Also, the portable device 301 may selectively include an external freshness sensor 1590. Of course, the portable device 301 may additionally include various components not shown in FIG. 15.

The application storage unit 1530 may receive freshness condition information of the refrigerator, display the freshness condition information, and store an application for controlling an operation of the refrigerator. That is, the application storage unit 1530 may store an application for controlling an operation according to a freshness condition of the refrigerator. When the application is provided in a client/server structure and the interface is provided in real time by using a HTTP protocol, applications using the HTTP protocol may be included in the application described in this application.

The operation of the above-described application may include various embodiments described with reference to FIGS. 7 and 11 to 13. Based on characteristics of the portable device 301, an arrangement of a message and the like in the screen may be determined in various ways according to an application.

The communication unit 1520 may transmit a setup condition that is set by using an application stored in the application storage unit 1530 to the server 300 and receive a message including freshness condition information that is received from the refrigerator and performance result information of the refrigerator from the server 300. This configuration is as described above with reference to FIGS. 3 to 6 and FIG. 8. The interface unit 1540 may output a screen of the application to allow the user to check a message presented by the application and select a particular function. An example of the execution of the application is described above with reference to FIG. 7 and FIG. 11 to FIG. 13.

In FIG. 15, the portable device 301 may selectively include the external freshness sensor 1590. This is for sensing freshness around the portable device 301 and instructing the refrigerator to perform a particular operation by using information sensed by the control unit, for example, humidity or temperature. For example, the control unit 1510 of the portable device 301 may calculate freshness condition information by using the temperature and humidity sensed by the external freshness sensor 1590, and may generate operation instruction information so that the refrigerator may perform a power cooling or sterilization/dehumidification/deodorization operation. The communication unit 1520 may transmit the generated operation instruction information to the refrigerator directly (using a direct Wi-Fi) or indirectly via the server 300.

The control unit 1510 may execute the application and control the communication unit 1520, the interface unit 1540, and the external freshness sensor 1590. A type of message received by the communication unit 1520 from the server 300 may include any one or more of freshness condition information, history information including a performance result, or setup information of the refrigerator to be changed.

A message to be displayed on the portable device 301 may include freshness condition information of the current refrigerator (1111 of FIG. 11), history information including a result in which the refrigerator operates according to an ambient freshness condition (1411 and 1422 of FIG. 14), and setup information of the refrigerator to be changed (1411 of FIG. 14).

The interface unit 1540 may display a message received by the communication unit 1520 in a pop-up form on the screen. The interface unit 1540 may touch the screen for selection or display any one or more of the above-described freshness condition information, history information, and performance result information on the screen according to an input signal for performing a screen switch.

In the embodiment of this application in which the portable device 301 is a smart phone, a communication method with the refrigerator 100 may include a wireless LAN method using Wi-Fi or a mobile communication such as 4G/5G using long term evolution-advanced (LTE-A).

The refrigerator 100 provided by this application may be configured to prevent the refrigerator 100 from being controlled by another user in a state in which the user externally sets the operation of the refrigerator by using the portable device 301.

For example, the refrigerator 100 may perform a sterilization operation, deodorization operation, dehumidification operation, power operation, and the like according to particulars set in FIGS. 11 to 14 and freshness condition information calculated from outside air temperature and humidity. Such operations may be transmitted to the portable device 301. In this process, an attempt may be made to stop the refrigerator 100 from performing the sterilization/deodorization/dehumidification/power operations or to touch and control the display unit 110 of the refrigerator 100 for the purpose of turning off any one of these functions. In this case, when the required sterilization/deodorization/dehumidification/power operations are stopped at an appropriate time due to erroneous control of the user, it may be difficult to maintain freshness. Therefore, when performing a particular operation according to the freshness condition information, the user may display a "LOCK" state in which control is temporarily stopped on the screen so that the user cannot control the refrigerator 100. As a displaying method, a mode set by the user may be blinked, or a phrase described as "In-operation of Maintaining Freshness" may be displayed.

Also, when the user that controls the refrigerator 100 is not located around the refrigerator 100, it is possible to display on the user's portable device 301 that there has been an attempt to stop an operation for maintaining the freshness of the refrigerator 100 or that someone has attempted to change operating modes for maintaining the freshness of the refrigerator 100. In particular, this configuration may prevent frequent changes of settings of the refrigerator in a situation where children are at home, especially may prevent easy changes of the sterilization, dehumidification, deodorization and power operation modes which are essential for freshness maintenance, thereby preventing the user from erroneously controlling the refrigerator 100 by mistake.

Figure 16:
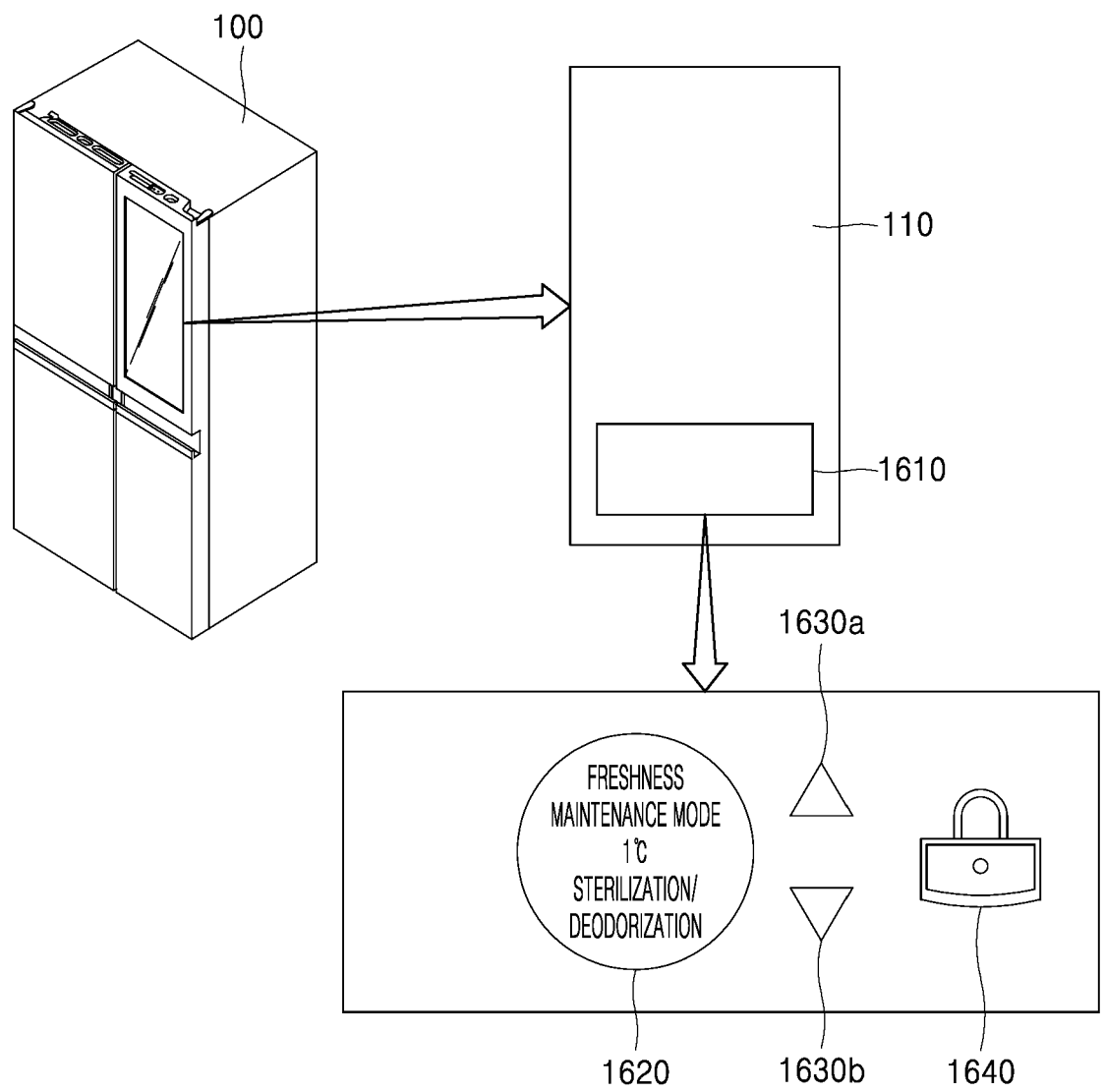
FIG. 16 is a view showing a state of a refrigerator that operates in an operation mode for maintaining freshness of food according to one embodiment of the present invention.

FIG. 16 is a view showing a state in which of control through the display unit (110 of FIG. 1) and the interface unit (201 of FIG. 2) for controlling the display unit is locked when a refrigerator operates in an operation mode for maintaining freshness of food according to one embodiment of the present invention. A touch area 1610, which can be controlled from outside, may be disposed at a lower end of the display unit 110. A mode and temperature of the currently operating refrigerator 100 may be displayed in a relevant area as shown in 1620. 1630*a* and 1630*b* indicate areas which are touchable so as to control temperature.

The display unit 110 may display an operating mode of the refrigerator as a freshness maintenance mode, and may display that the refrigerator is operating in a sterilization and deodorization mode for maintaining freshness, and the temperature is set to 1 degree as a target temperature. Here, when the user around the refrigerator determines that the temperature is low and selects 1630*a*, an icon indicated by 1640 may blink or a beep sound may be output so as to alert the user that a temperature control portion is currently locked due to the freshness maintenance mode.

In addition, a portion indicated by 1620 may blink in the touch area 1610 so that the user easily realizes that the current operation mode is set to perform an automatic operation for maintaining freshness.

When the user selects an operation mode corresponding to freshness context awareness such as an automatic operation mode for maintaining freshness and gives priority to the operation mode by using the portable device 301, an operation state of the refrigerator may be locked by the display unit 110 of FIG. 16 so that the operation state cannot be changed. Further, in another embodiment, when the operation state is changed, the automatic operation mode may be operated with priority by the user, and thus the display unit 100 may display that the user's control may cancel the operation mode corresponding to the freshness context awareness, thereby preventing the user from inadvertently stopping the operation mode corresponding to the freshness context awareness. According to this embodiment, it is possible to prevent the refrigerator from being inadvertently controlled in a situation where the user who controls the refrigerator is outside. In addition, the portable device 301 can be notified about the user of the occurrence of a control for cancelling the operation mode according to the freshness context awareness through a pop-up message or the like, and the portable device 301 may control whether or not the operation mode is canceled.

When the current operation state is notified to the touch area 1610 on the display unit 110 as shown in FIG. 16, the user may not recognize that the refrigerator operates differently from original settings as a failure.

In FIG. 16, a locked state as shown in 1640 may be displayed separately from an operation of a general refrigerator. For example, even when the touch area 1610 of the refrigerator is set to be usually controllable, the locked state may be automatically displayed in an operation mode for maintaining freshness of food, so that it is possible to control the "LOCK" state to be automatically maintained. An operation for maintaining the "LOCK" state may be controlled by the interface unit 201.

FIG. 17 is a view showing a screen of a portable device according to one embodiment of the present invention. A screen shown in 1710 will be described. When a touch for changing the temperature in the touch area 1610 or unlocking a lock 1640 occurs in order to change the settings of the operation mode corresponding to the freshness context awareness as shown in FIG. 16, the communication unit (230 of FIG. 2) of the refrigerator 100 may show that cancellation of the safe storage operation for the refrigerator has been attempted through the pop-up message of the portable device 301 indicating that a cancellation attempt has occurred as shown in 1711. This message may be transmitted from the refrigerator 100 to the portable device directly or indirectly via the server (300 of FIG. 3). When the user selects a "Cancel" button in 1711, a priority operation of the refrigerator may be canceled. In this case, the operation mode of the refrigerator may be changed in the touch area 1610 of FIG. 16.

After the priority operation is cancelled, a message indicating the cancellation of the priority operation may be displayed as shown in 1712 of 1720. The massage may indicate that re-setup is possible. When a portion described as "Priority Operation Lock" is selected for re-setup, the priority operation may be set and controlled not to be changed. When an attempt is made to change, it is possible to control the portable device to display a message indicating that a change attempt has occurred as shown in 1710.

As shown in FIGS. 16 and 17, when the user tries to change a mode through the display unit 110 and the screen of the portable device 301, the automatically controlled state may be set as a priority, whereby a certain restriction may be imposed on a change of the mode, or the mode may not be changed.

In addition, when a plurality of portable devices each are connected to one refrigerator, priority may be given to these portable devices. For example, when operation instruction information provided by a first portable device and operation instruction information provided by a second portable device are in conflict or contradiction relation with each other, the refrigerator may operate according to operation instruction information provided by a portable device having a high priority.

In one embodiment, the first portable device may have a higher priority, and the second portable device may have a lower priority, and a screen such as 1710 of FIG. 17 may be displayed on both portable devices. Here, when "Maintain" is selected in 1711 of FIG. 17 through the first portable device and "Cancel" is selected in 1711 of FIG. 17 through the second portable device, "Maintain" selected through the first portable device having a higher priority among the two portable devices may be applied to the refrigerator.

Therefore, when setup operating condition information inconsistent with the operation instruction information is set or execution of an instruction to stop the freshness control operation according to the operation instruction information is confirmed while the control unit 200 of FIG. 2 performs the freshness control operation according to the operation instruction information, such an instruction may not be executed immediately. The control unit 200 may set a high priority to the freshness control operation that is performed according to the operation instruction information, and thereby the control unit 200 may not execute an instruction to change temperature or request an stoppage of the sterilization/dehumidification/deodorization, or may output a message described as "In-Operation of Controlling Freshness" to the user by using the interface unit 201 and the display unit 110.

When the embodiment of the present invention is applied, the refrigerator 100 may select the operation mode to prevent the food from being deteriorated when conditions such as temperature and humidity around the refrigerator 100 to increase a possibility of food deterioration are recognized. Also, the operation mode may be selected so that the refrigerator 100 preliminarily maintains the freshness of the food by reflecting the temperature and humidity of a region where the refrigerator 100 is located.

In addition, when the embodiment of the present invention is applied, the refrigerator 100 may perform operations such as dehumidification and deodorization by using the operation instruction information provided by the server 300 or the portable device 301 that is an external device. Also, a history of the freshness control operation performed by the refrigerator 100 may be provided to the server 300 or the portable device 301 to guide the user to change the setup operating condition information of the refrigerator 100 in context.

Although a process of transmitting and receiving information between the portable device 301 and the refrigerator 100 on the basis of the server 300 is described in this application, the present invention is not limited thereto. All types of computing devices with computing power may be deployed on the server to implement the present invention. That is, the portable device 301 may be directly connected to the refrigerator 100 to control the freshness of the refrigerator.

Even if it was described above that all of the components of an embodiment of the present invention are coupled as a single unit or coupled to be operated as a single unit, the present invention is not necessarily limited to such an embodiment. That is, among the components, one or more components may be selectively coupled to be operated as one or more units. In addition, although each of the components may be implemented as an independent hardware, some or all of the components may be selectively combined with each other, so that they can be implemented as a computer program having one or more program modules for executing some or all of the functions combined in one or more hardwares. Codes and code segments forming the computer program can be easily conceived by a person skilled in the technical field of the present invention. Such a computer program may implement the embodiments of the present invention by being stored in a computer readable storage medium, and being read and executed by a computer. A magnetic recording medium, an optical recording medium, a carrier wave medium, or the like may be employed as the storage medium. Also, a computer program to implement an embodiment of the present invention may include a program module that is transmitted in real time via an external device.

The present invention is described with reference to embodiments described herein and accompanying drawings, but is not limited thereto. It should be apparent to those skilled in the art that various changes or modifications which are not exemplified herein but are still within the spirit and scope of the present disclosure may be made.

DESCRIPTION OF SYMBOLS

| | |
|---|---|
| 100: Refrigerator | 110: Display unit |
| 200: Control unit | 210: Freshness context awareness unit |
| 215: Door sensing unit | 230: Communication unit |
| 240: Database unit | 280: Internal freshness sensor |
| 290: External freshness sensor | 300: Server |
| 301: Portable device | |

The invention claimed is:

1. A refrigerator for controlling operations for freshness of contents based on assessed conditions, comprising:
   one or more partitioned storage spaces, any one or more of the storage spaces being operated based on a setup operating condition information that is preset;
   one or more freshness sensors configured to sense conditions outside the storage spaces or inside the storage spaces;
   a communication device configured to transmit sensed condition information from the freshness sensors to a server or an external device, and to receive operation instruction information from the server or the external device; and
   a controller configured to control the freshness sensors and the communication device and configured to perform a freshness control operation according to the operation instruction information,
   wherein the operation instruction information includes instructions to control the refrigerator in a different manner from the setup operating condition information set for any one or more of the storage spaces,
   wherein the controller is configured to:
      generate condition based operating condition information based on the conditions sensed by the freshness sensors;
      perform the freshness control operation based on the condition based operating condition information,
   wherein the condition based operating condition information is operating condition information that is different from the setup operating condition information that is set for any one or more of the storage spaces.

2. The refrigerator of claim 1, wherein the controller is configured to select one of the operation instruction information, the setup operating condition information, and the condition based operating condition information.

3. The refrigerator of claim 1, wherein the communication device is configured to transmit the setup operating condition information to the server or the external device and to receive the operation instruction information reflecting the setup operating condition information from the server or the external device.

4. The refrigerator of claim 1, wherein the operation instruction information includes one or more of time information for performing the freshness control operation, deodorization operation information, dehumidification operation information or sterilization operation information to be performed on any one of the storage spaces or the entire refrigerator, and temperature information.

5. The refrigerator of claim 1, wherein the controller is configured to compare the operation instruction information and the setup operating condition information to generate the condition based operating condition information.

6. The refrigerator of claim 1, wherein the communication device is configured to transmit the freshness condition information to the server or the external device.

7. The refrigerator of claim 1, wherein the controller is configured to use temperature or humidity sensed by the freshness sensors or to use average temperature and humidity of a geographical region where the refrigerator is located to determine a probability of food deterioration.

8. The refrigerator of claim 1, wherein the condition based operating condition information includes time information for performing a freshness control operation, and deodorization operation information, dehumidification operation information or sterilization operation information to be performed on any one of the storage spaces or the entire refrigerator.

9. The refrigerator of claim 1, wherein the sensed condition information transmitted to the external device causes the external device to display a notification to the user to place food into the refrigerator due to potential for spoilage.

10. The refrigerator of claim 1, further comprising a display for displaying one of a plurality of warnings for food contamination based on the sensed condition information.

11. The refrigerator of claim 1, wherein the freshness control operation includes at least one of decreasing operating temperature, deodorization, sterilization or dehumidification.

12. The refrigerator of claim 11, wherein the freshness control operation according to the operation instruction information is performed for a prescribed amount of time and the refrigerator is returned to operation based on the setup operating condition information.

13. The refrigerator of claim 12, wherein the freshness control operation is performed automatically based on at least one of the sensed conditions, historical sensed conditions, or sensed conditions in a geographical region associated with a location of the refrigerator.

* * * * *